United States Patent [19]
Planas et al.

[11] Patent Number: 6,112,015
[45] Date of Patent: Aug. 29, 2000

[54] NETWORK MANAGEMENT GRAPHICAL USER INTERFACE

[75] Inventors: Miguel Alberto Planas, Ottawa; Doug Edward Talbott, Kanata, both of Canada

[73] Assignee: Northern Telecom Limited, Montreal, Canada

[21] Appl. No.: 08/764,086

[22] Filed: Dec. 6, 1996

[51] Int. Cl.[7] ............................ G06F 15/62; G06F 15/00
[52] U.S. Cl. ............................ 395/200.53; 395/200.5; 395/200.54; 395/683; 345/357; 345/347; 345/348
[58] Field of Search .................... 395/200.5, 200.53, 395/200.54, 683; 345/326, 329; 364/DIG. 1, DIG. 2, 226.2; 701/1, 5, 6

[56] References Cited

U.S. PATENT DOCUMENTS

| | | | |
|---|---|---|---|
| 5,261,044 | 11/1993 | Dev et al. | 395/200.53 |
| 5,295,244 | 3/1994 | Dev et al. | |
| 5,325,481 | 6/1994 | Hunt. | |
| 5,375,199 | 12/1994 | Horrow et al. | |
| 5,394,522 | 2/1995 | Sanchez-Frank et al. | 395/200.5 |
| 5,394,523 | 2/1995 | Harris. | |
| 5,471,399 | 11/1995 | Tanaka et al. | 395/184.01 |
| 5,483,631 | 1/1996 | Nagai et al. | 395/200.54 |
| 5,586,255 | 12/1996 | Tanaka et al. | 395/200.53 |
| 5,726,979 | 3/1998 | Henderson et al. | 370/254 |

OTHER PUBLICATIONS

ISO/IEC 10164–2, Information Technology—Open Systems Interconnection—System Management—Part 2, State Management Function (for CCITT Applications) CCITT Rec. X.731.

ISO/IEC 10164–2, Information Technology—Open Systems Interconnection—System Management—Part 2, State Managment Function (for CCITT Applications) CCITT Rec. X.731 (1992)/Proposed Draft Amd. 1 (199x E).

ISO/IEC 10164–2, Information Technology—Open Systems Interconnection—System Management—Amd. 1:1996(E).

Generic Requirements GR–1093–CORE, Issue 1 Oct. 1994, Bellcore Generic State Requirements for Network Elements.

Generic Requirements GR–1093–CORE, Revision 1, Dec. 1995, Bellcore Generic State Requirements for Network Elements.

*Primary Examiner*—Frank J. Asta
*Assistant Examiner*—Ivan C. Pierce, III

[57] ABSTRACT

A method is provided for graphically depicting detailed state and status information for network objects, particularly network objects forming part of a telecommunications network. A graphical representation of a network is displayed in which a basic icon is displayed for each network object. More commonly occurring state and status combinations are conveyed by imparting attributes to the basic icons such as dashed, solid, or three dimensional outlines. Less commonly occurring state and status combinations are conveyed by attaching modifier icons to the basic icons. The method is particularly suited to providing a detailed visual representation of the states and statuses included in the OSI standard.

47 Claims, 31 Drawing Sheets

Fig. 4d
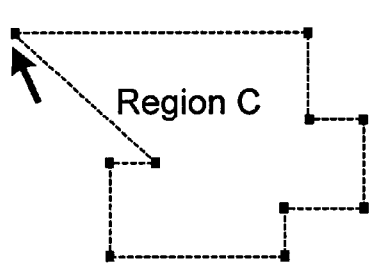 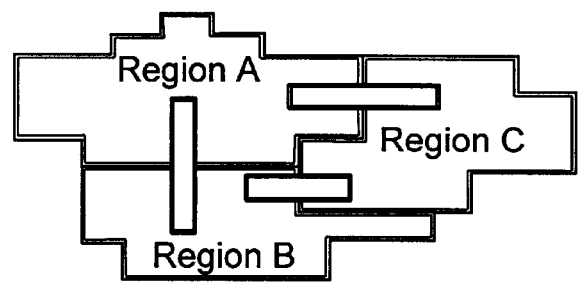

Fig. 5

OSI State Table

| State or Status | Disabled, Idle | Enabled, Idle | Enabled, Active |
|---|---|---|---|
| Default usage and operational states<br><br>Disabled is represented by a dashed outline. Enabled, idle is represented by a solid outline. Enabled, active is represented by a 3D outline. In doing so, nodes, links and cards all use the same visual vocabulary.<br><br>Additional administrative, procedural and control status is implied by the visual vocabulary and is listed in each table cell. As state or status changes, new icons are added to these base shapes. | <br><br>Disabled<br>Idle<br>Unlocked<br>Not initialized<br>Off line | <br><br>Enabled<br>Idle<br>Unlocked | 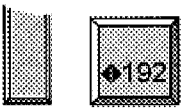<br><br>Enabled<br>Active<br>Unlocked |

Fig. 6

OSI State Table

| State or status | Disabled, Idle | Enabled, Idle | Enabled, Active |
|---|---|---|---|
| Usage states | | | |
| Usages states include idle, active and busy. Because network elements are frequently idle or active, these states have been represented as part of the default visual appearance of the object. See above. | | | 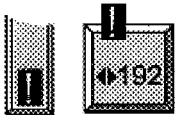 Busy The resource is in use with no spare capacity. |
| Administratives states | | | |
| Administrative states include locked, shutting down and unlocked | 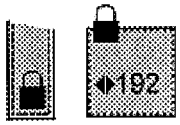 Locked The resource is administratively prohibited from performing user services. | 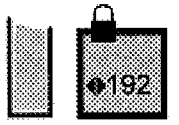 Locked The resource is administratively prohibited from performing user services. | 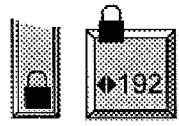 Shutting down The resource is administratively permitted to existing instances of use only. The resource is shedding traffic. |

Fig. 7
| OSI state combination | Node, link and card graphic treatment |
|---|---|
| Operation: Disabled<br>Usage: Idle<br>Administration: Unlocked |   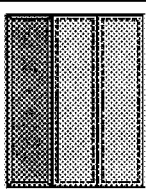 |
| Operation: Enabled<br>Usage: Idle<br>Administration: Unlocked |   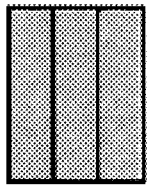 |
| Operation: Enabled<br>Usage: Active<br>Administration: Unlocked |   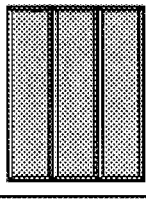 |

Fig. 8
OSI State Table
| State or Status | Disabled, Idle | Enabled, Idle | Enabled, Active |
|---|---|---|---|
| Procedural Status | | | |
| Initialization required |  | | |
| Initializing |  |  | |
| Terminating |  |  |  |
| Reporting<br><br>According to the standard this usually implies test results are being returned. | |  |  |

Fig. 9

OSI State Table

| State or status | Disabled, Idle | Enabled, Idle | Enabled, Active |
|---|---|---|---|
| Availability status | | | |
| In test | ▨ | | |
| Failed<br><br>Most likely coupled to an alarm, outstanding alarm or loss of connectivity. | ▨ | | |
| Power off<br><br>Most likely coupled to an alarm, outstanding alarm or loss of connectivity. | ▨ | | |
| Off duty | ▨ | ▨ | |
| Degraded<br><br>A gray version of the busy icon was used to depict degraded service. The rationale (correct or incorrect) was that this status could adversely effect and possibly parallel the usage state. | | ▨ | ▨ |
| Not installed | ▨ | | |

Fig. 10
OSI State Table
| State or status | Disabled, Idle | Enabled, Idle | Enabled, Active |
|---|---|---|---|
| Control Status | | | |
| Subject to test | | 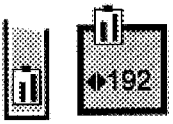 | 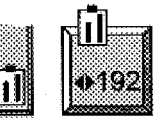 |
| Reserved for test | 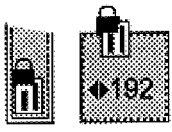 | 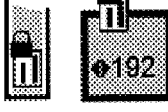 | 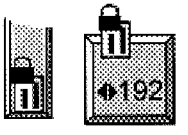 |

Fig. 11

OSI State Table

| State or status | Disabled, Idle | Enabled, Idle | Enabled, Active |
|---|---|---|---|
| Standby status | | | |
| Standby status includes cold standby, hot standby and providing service. | 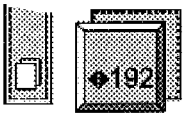<br>Cold standby<br>The resource is not providing service and cannot immediately take over the role of the primary resource. | <br>Hot standby<br>The resource is not providing service but can immediately take over the role of the primary resource. | <br>Providing service<br>A backup resource has been put into service. Applies only to backup resources. |

Fig. 12

OSI State table

| State or status | Disabled, Idle | Enabled, Idle | Enabled, Active |
|---|---|---|---|
| Simultaneous state and status display | | | |
| 160 — Across and within each status set (Control, Availability, etc.), there may be a need or desire to show concurrent status or states.<br><br>The developer can display several states by listing the appropriate icons visually on the card or node. | Operational: Disabled<br>Usage: Idle<br>Admin: Locked<br>Availability: In test | Operational: Enabled<br>Usage: Idle<br>Admin: Locked<br>Control: Reserve for test<br>Procedure: Reporting | |
| 162 — As an alternative to showing too many states on a card, link or node, the developer may optionally use the information icon to draw a user's attention to a change in state or status.<br><br>The state or status details could then be displayed in a popup or window that can be accessed by clicking on the information icon. One possible example is shown at right. | | | |
| | Operation: Item<br>Usage: Item<br>Admin: Item<br>Procedural: Item, item<br>Control: Item, item<br>Availability: Item, item | | |

Fig. 16

| Alarm status | | | |
|---|---|---|---|
| New alarms<br><br>New alarms are shown by displaying an alarm bubble with the new alarm count (1M). Totals are shown inside the node. The examples shows a new Major alarm is shown as an example; see section on alarm strategy for more details. | | 120 | 122 |
| Outstanding alarms<br><br>The example show a critical alarm acknowledged; see section on alarm strategy for more details. | 124 | 126 | 128 |
| Under repair<br><br>The examples show no new or outstanding alarms. The acknowledge alarm visual could also be visible. | | | |

Fig. 17

| Status | Region, node, link, and shelf graphic |
|---|---|
| Critical alarm (OSI) New alarms are shown by displaying an alarm bubble with the new alarm count. Total of all new or outstanding alarms are contained in the element. | 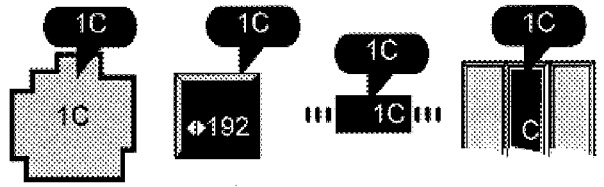 |
| Major alarm (OSI) New alarms are shown by displaying an alarm bubble with the new alarm count. Total of all new or outstanding alarms are contained in the element. | 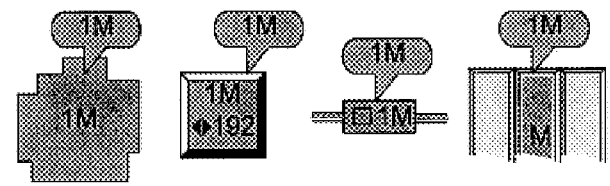 |
| Minor alarm (OSI) New alarms are shown by displaying an alarm bubble with the new alarm count. Total of all new or outstanding alarms are contained in the element. | 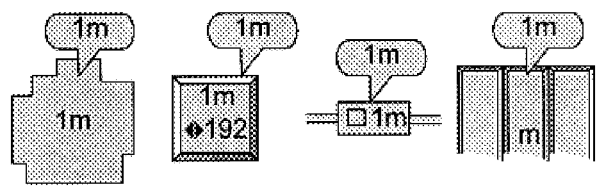 |
| Warning alarm New alarms are shown by displaying an alarm bubble with the new alarm count. Total of all new or outstanding alarms are contained in the element. | 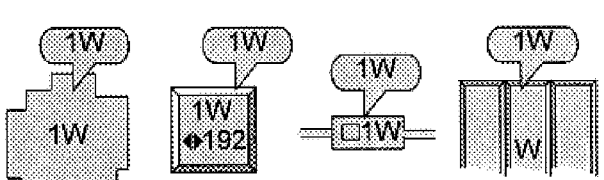 |
| Unknown status (OSI) Loss of connectivity While not a true alarm state, it is such as serious condition that it is included in this visual strategy. | 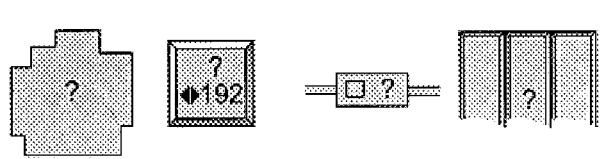 |

Fig. 18

| Status | Region, node, link and shelf graphic |
|---|---|
| Outstanding alarm (OSI) Acknowledged alarm<br><br>The example shows one outstanding critical alarm (1C) and a number of other outstanding lower level alarms (+). | 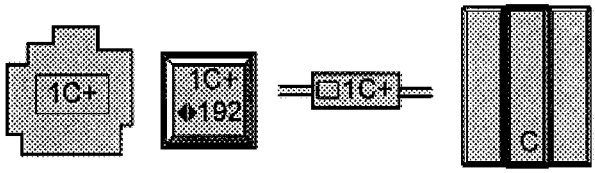 |
| Under repair (OSI)<br><br>The hand icon represents under repair. The alarm count would not necessarily be displayed and the state would not be necessarily be "enabled and active". | 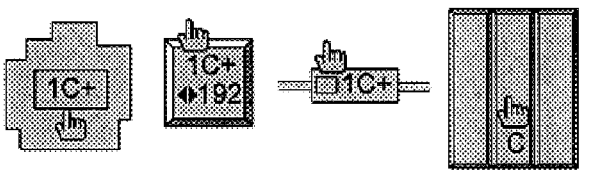 |

| | | | |
|---|---|---|---|
| A |  | Operational/usage:<br>Administrative:<br>Availability:<br>Alarm status: | Enabled, Active<br>Unlocked<br><br>New alarm |
| B |  | Operational/usage:<br>Administrative:<br>Availability:<br>Alarm status: | Enabled, Active<br>Unlocked<br><br>Outstanding |
| C | 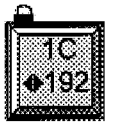 | Operational/usage:<br>Administrative:<br>Availability:<br>Alarm status: | Enabled, Active<br>Shutting down<br><br>Outstanding |
| D | 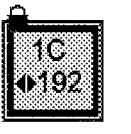 | Operational/usage:<br>Administrative:<br>Availability:<br>Alarm status: | Enabled, Idle<br>Locked<br><br>Outstanding |
| E | 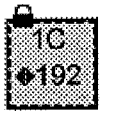 | Operational/usage:<br>Administrative:<br>Availability:<br>Alarm status: | Disabled, Idle<br>Locked<br><br>Outstanding |
| F | 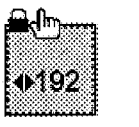 | Operational/usage:<br>Administrative:<br>Availability:<br>Alarm status: | Disabled, Idle<br>Locked<br><br>Under repair |
| G |  | Operational/usage:<br>Administrative:<br>Availability:<br>Alarm status: | Disabled, Idle<br>Locked<br>In test<br>Under repair |

NETWORK MANAGEMENT GRAPHICAL USER INTERFACE

FIELD OF THE INVENTION

The invention relates to network management, and more particularly to a graphical user interface suitable for use in the management of large telecommunications networks.

BACKGROUND OF THE INVENTION

It is common to employ one of many existing network management tools to manage computer and/or telecommunications networks. These tools typically run on PC or UNIX workstations. In the telecommunications context, network management tools enable the maintenance, surveillance and administration of the multiple telecommunication devices which make up the network. Tasks performed by these network management tools through a network management interface include alarm monitoring, test and diagnosis of faults, performance monitoring and connection management.

An objective of most network management tools is to provide a centralized view of the network so as to enable the correlation of events and conditions that span network elements and subnetworks. A further objective is to facilitate the management of a network consisting of a non-homogeneous collection of telecommunication devices. Some existing network management tools provide GUI (graphical user interface) access to the users. An example of a data network management tool which provides GUI access to users is HP Open view. This tool and its associated GUI is appropriate for the management of data networks in which a set of relatively simple nodes may be complexly meshed. The nodes are simple in the sense that from the network management perspective, they can be in only one of a very small number of states. This tool and others like it are not appropriate for the management of even simple telecommunications networks which include nodes which are very complex. Telecommunications nodes are complex in the sense that from the network management perspective, they can simultaneously be in one or more of a large number of states.

There exist Bellcore and ISO (International Standards Organization) standards which include OSI (Open Systems Interconnect) standards which specify a set of generic states network objects forming part of a telecommunications network can be in. Network objects are products produced by a variety of different vendors and include nodes, links and shelf based equipment. The intent of the generic states is to allow network objects which are compliant with these standards to be maintainable remotely by non-vendor specific network management tools. These standards provide a textual definition to the states but the graphical representation of the permutations and combinations of these states is left up to network management tool developers. This opens the door to very complex and cluttered visual displays or more commonly to the superimposition of acronym subscripts and superscripts on top of the visual displays to avoid confusion. These standards are meant to be applied to most telecommunication network objects. Prior art network management GUI tools have not incorporated the full OSI and BellCore state models or have failed to do so in a manner which efficiently expresses them in a simple visual language which does not consume excessive space in the windows on a screen. The common approach is for such tools to address only a subset of the aforementioned standards, and to create new arbitrary "meta-states" that represent combinations of states.

The specific ISO standards and Bellcore requirements which are applicable are of course subject to change over time. At this time the relevant ISO standard is : ISO/IEC 10164-2, Information Technology—Open Systems Interconnection—System Management—Part 2, State Management Function (for CCITT Applications) CCITT Rec.X.731 (now ITU-T). The relevant Bellcore requirement is: Generic Requirements GR-1093-CORE, Issue Oct. 1, 1994 & Revision Dec. 1, 1995, Bellcore, Generic State Requirements for Network Elements.

SUMMARY OF THE INVENTION

It is an object of the invention to provide an improved network management GUI.

This invention is concerned with a GUI language used to perform network management of telecommunications networks.

According to a first broad aspect, the invention provides a processor implemented method for displaying information relating to a telecommunications network consisting of a plurality of network objects using a network management terminal having a display, the information consisting of a base state for at least one of the network objects, the method comprising the steps of: displaying on the display for each network object a basic icon corresponding to that network object; imparting to the display of each said at least one basic icon an attribute representative of the base state of the corresponding network object.

According to a second broad aspect, the invention provides a method for displaying OSI state and status information relating to a telecommunications network consisting of a plurality of network objects using a network management terminal having a display and processing means, the method comprising the steps of: the processing means converting the OSI state and status information into base states and supplementary states for each network object; the processing means displaying on the display for each network object a basic icon representative of that network object, the basic icon being a node icon for a node network object, a card icon for a card network object, and a link icon for a link network object; imparting to the display of at least one basic icon at least one attribute selected from a predetermined set of possible attributes; adding to the display of each basic icon zero or more modifier icons selected from a predetermined set of possible modifier icons; wherein each attribute is representative of a different predetermined base state; wherein each modifier icon is representative of a different predetermined supplementary state.

According to a third broad aspect, the invention provides a system for monitoring a telecommunications network consisting of a plurality of network objects, the system consisting of: a network management terminal having a display and processing means; means for conveying network management information from the network to the network management terminal; wherein the processing means displays on the display for each network object a basic icon representative of that network object; wherein the processing means converts the network management information into a base state for each of at least one network object; wherein the processing means imparts to each basic icon representative of said at least one network object at least one attribute selected from a predetermined set of possible attributes; wherein each attribute is representative of a different predetermined base state.

BRIEF DESCRIPTION OF THE DRAWINGS

Preferred embodiments of the invention will now be described with reference to the attached drawings in which:

FIG. 4d illustrates an example of several container icons that have interlocking shapes;

FIG. 5 illustrates network icons in each of three base states;

FIG. 6 illustrates network icons in the usage state "Busy", and the Administrative states "Locked" and "Shutting Down";

FIG. 7 illustrates a node icon, a link icon, and a card icon in each of the three base states;

FIG. 8 illustrates modifier icons identifying the Procedural status;

FIG. 9 illustrates modifier icons identifying the Availability status;

FIG. 10 illustrates modifier icons identifying the Control status;

FIG. 11 illustrates modifier icons identifying the Standby status;

FIG. 12 illustrates the simultaneous display of states and statuses;

FIG. 16 illustrates modifier icons identifying the Alarm status;

FIG. 17 illustrates further details of New alarm modifier icons;

FIG. 18 illustrates the depiction of outstanding alarms and alarms which are under repair;

FIG. 19 illustrates an example of the graphical depiction of a typical series of state and status transitions which might occur during an alarm scenario;

DETAILED DESCRIPTION OF THE PREFERRED EMBODIMENTS

A telecommunications network consists of an interconnected set of network objects. There are three basic types of network objects, these being (1) network elements or nodes, (2) links, and (3) individual cards in a piece of shelf-based equipment.

Examples of network elements or nodes include voice switches, packet switches, cross connects, ATM (Asynchronous Transfer Mode) switches, ATM access and transport nodes. Network elements include shelf-based equipment located in a telecommunications company central office such as an ATM Concorde or OC192 ADM (Add-Drop Multiplexer) and field based equipment such as a coaxial node. A network element which is shelf-based is composed of a set of circuit cards installed in one or more shelves. An individual card in one of these shelves is also considered a network object. In this case, the piece of shelf-based equipment as a whole is a considered a network object, and at the same time each individual card in the shelf-based equipment is a network object.

Links connect nodes together and include copper wire links, microwave links, satellite links, coaxial links and optical fibre links for example. In some instances, repeaters may also be considered to be part of a link.

Additional components may be connected to the network which are used to manage the telecommunications network. Examples include databases, operating systems, terminals and printers. These components are not network objects, and do not form part of the telecommunications network per se.

Figure 1:
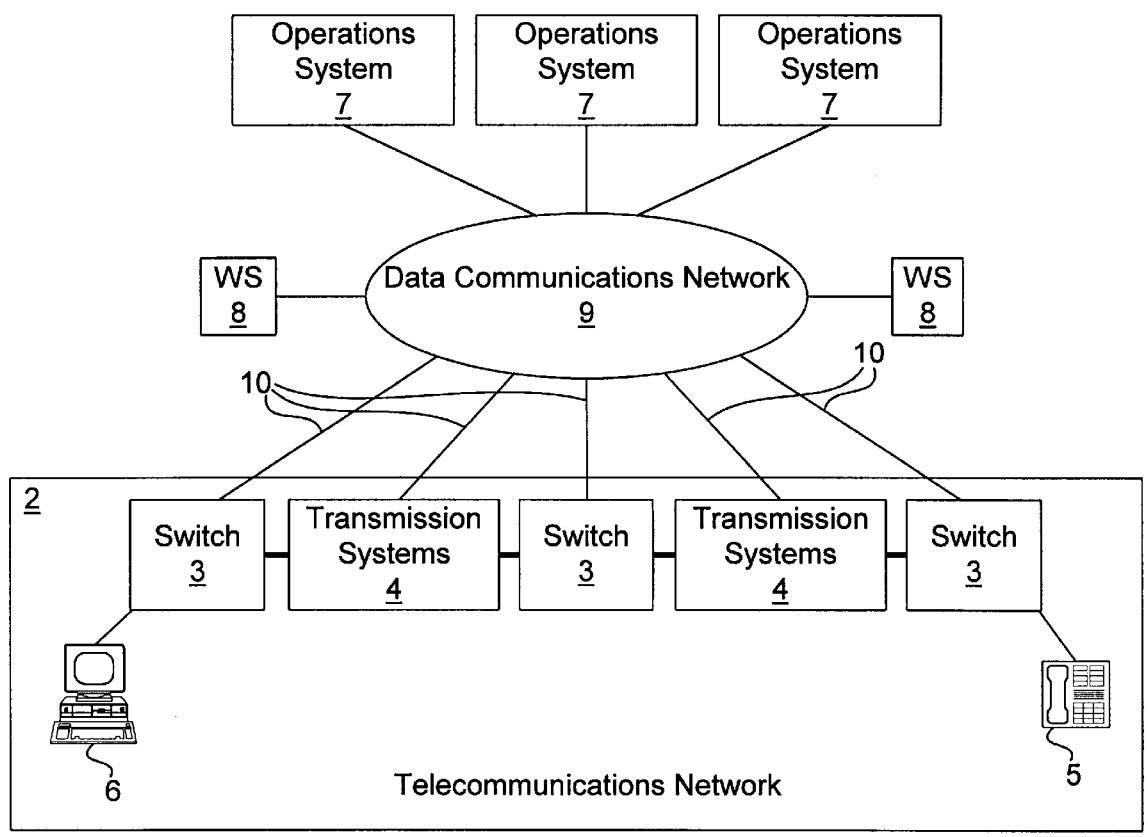
FIG. 1 is a context diagram for the application of the invention.

FIG. 1 shows a physical context for the application of the present invention. There is a telecommunications network 2 consisting of a number of nodes or switches 3 and a number of links or transmission systems 4. The main network traffic consists of data or voice signals on the transmission systems 4 between the switches 3. Subscribers may access the network 2 with devices such as telephones 5 or personal computers 6 equipped with modems. In addition, there is managing equipment consisting of operations systems devices 7 and workstations 8 connected to a data communications network 9. The data communication network 9 includes a connection 10 to each of the switches 3 (nodes) and transmission systems 4 (links) in the telecommunications network 2. Management traffic flows on the data communications network 9 between the switches 3 and the managing equipment 7,8, the management traffic consisting of information for monitoring and controlling the network. The management traffic flows on the data communications network according to a communications protocol P which allows the switches and the management equipment devices 7,8 to understand each other. The interface between one of the network management devices 7,8 and the telecommunications network 2 may be referred to as a network management interface. The network management traffic may include state and status information for the switches 3 (nodes) and transmission systems 4 (links), and may also contain test, or traffic information for example. One or more of the management equipment devices 7,8 runs a network management GUI according to the invention and these management equipment devices will be referred to as network management terminals. These GUI equipped network management terminals have access to and in some cases control over network management information. A processor (not shown) forming part of each network management terminal receives the network management information, processes it, and presents it graphically on a display (not shown) with the GUI according to the invention. The invention provides a top level graphical view of the network objects which make up a network, and at the same time shows detailed state and status information for each network object. This gives network operators the ability to quickly visually interpret the state of the network at any time.

In the graphical representation of a network according to the invention, a basic icon is used to represent each network object. Icon attributes may be imparted to a basic icon to display state and status information for the network object represented by the basic icon. Icon attributes may include various icon outlines, shadings or three dimensional appearances as applied within the border or perimeter of the basic icon, for example. Further state and status information is displayed by attaching modifier icons to the basic icon. The various basic icons will be described with reference to FIGS. 1 to 4, and the manner in which state and status information is added to these icons will be described with reference to FIGS. 5 to 19.

Figure 2A:
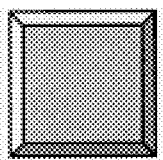
FIGS. 2a–2d illustrate three different types of basic network element icons.

A different basic icon shape is used to represent each of the three types of network object, namely nodes, links, and cards within a shelf. Referring now to FIG. 2a, a basic icon is shown which consists of a light grey coloured square icon used to represent a node. This will be referred to as a node icon. Identification symbols and numbers may be added to the basic icon to identify the type and capacity of the node it represents. A preferred set of identification symbols which includes some symbols recommended by the ITU-T is shown in FIG. 2e and several node icons identified with these symbols are shown in FIG. 2f. Referring to FIG. 2e, the ITU-T (International Telecommunications Union-Telecommunications Standardization Sector) based symbols include a square encompassing an "X" 12 representing a switch or a cross connect, a solid diamond 13 representing a transport node, a pair of solid triangles 14 representing a transport add-drop multiplexer, and a diamond separated into four squares 15 representing a transport cross connect. Suggested new symbols include a triangle with a series of parallel lines 16 representing an access node, a diamond which is solid except for a square hole in its centre 17 representing a regenerator, a diamond with a vertical slot in its bottom half to represent an LTE (line terminating equipment) and a question mark symbol 19 to represent an unknown network element. In some circumstances a symbolic node icon may be used which differs from the square icon depicted in FIG. 2a so as to be more representative of the node it represents.

Referring now to FIG. 2f, several examples of node icons for network elements are shown. Node icon 20 includes a symbol identifying it as a Transport ADM and the text "192" identifies its capacity. Node icon 21 represents an access element, with the text "FCOT" identifying the element as a Fibre Central Office Terminal. Node icons 22,23 represent transport cross connect network elements.

Figure 2B:
Figure 2C:
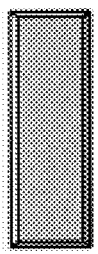
Figure 3:
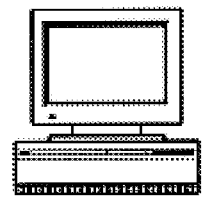
FIG. 3 illustrates a pictorial icon.
Figure 2D:
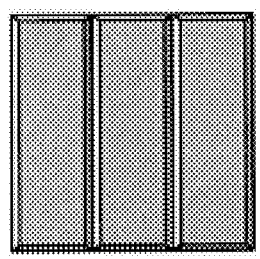
Figure 2E:
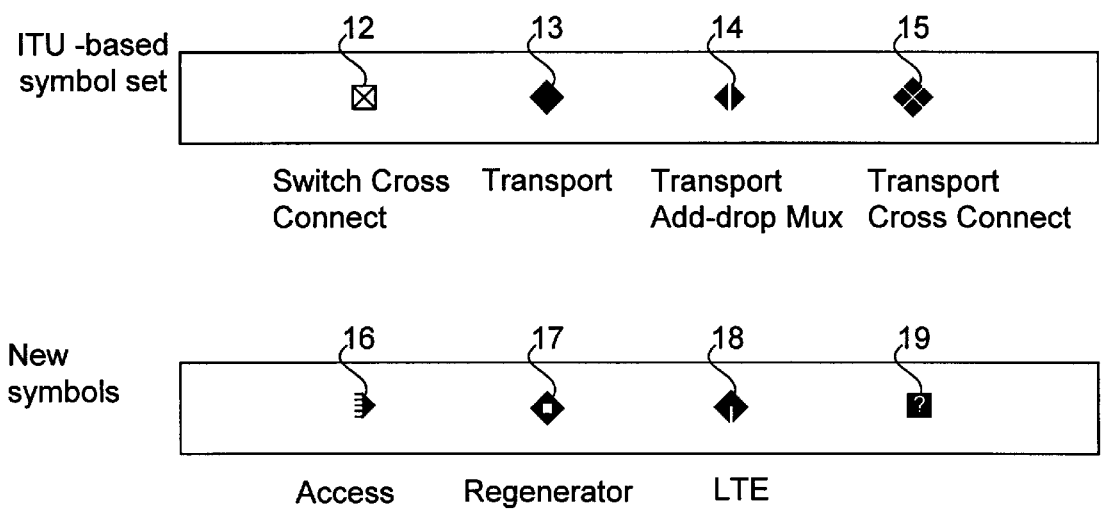
FIG. 2e illustrates a symbol set for identifying classes of network icons.
Figure 2F:
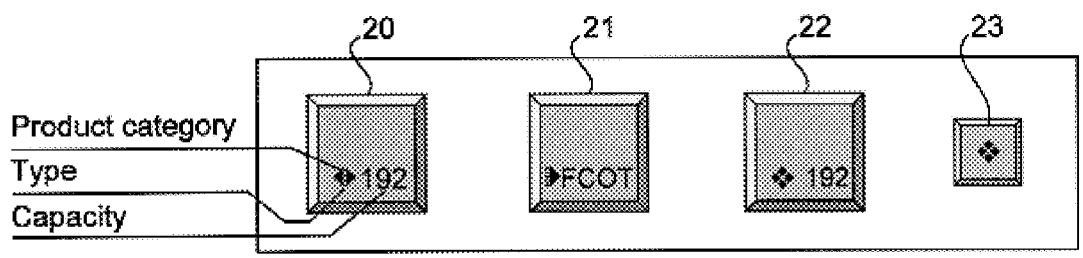
FIG. 2f illustrates several network element icons identified with symbols from the set illustrated in FIG. 2e.
Figure 2G:
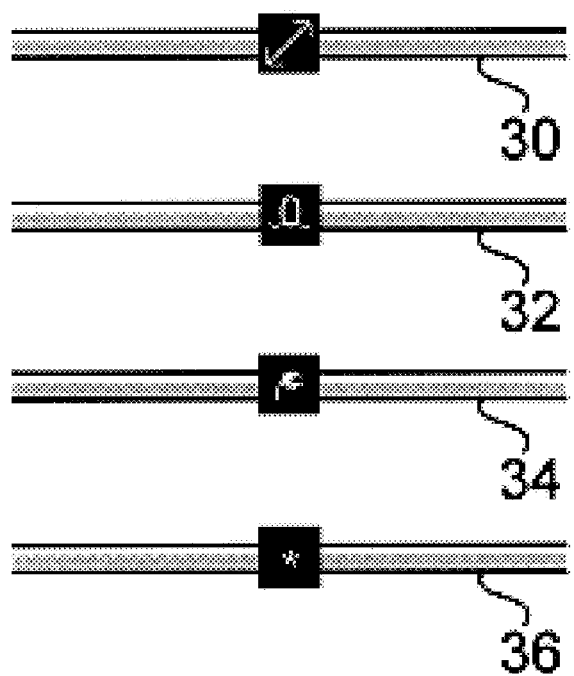
FIG. 2g illustrates several link icons.

Referring now to FIG. 2b, a basic icon is shown which consists of a very thin rectangular green or light grey coloured icon used to represent a link. This will be referred to as a link icon. Links between two nodes are shown by link icons connecting the nodes and having a link type specifier icon in the centre of the link icon. In FIG. 2b only a segment of a link icon is shown. A link icon may consist of a series of segments which are arranged around other displayed icons so as no to interfere with them. Shown in FIG. 2g are preferred link icon link representations for each of CNET (control network) 30, optical fibre 32, and Electrical 34 type links. A more compact visual strategy may be employed when more than one link connects the same two nodes by using a single link bundle icon 36 instead of a series of individual link icons for the links. The four link icons described above are intended to be used to convey state and status information as discussed in detail below.

For nodes which are shelf-based, consisting of a number of cards, a node icon may be used to represent the entire node, or alternatively, a card icon representing each of the cards individually may be used. Referring now to FIG. 2c, a basic icon is shown which consists of a light grey coloured vertically oriented rectangular icon used to represent a card within a piece of shelf-based equipment. This will be referred to as a card icon. Typically, several card icons representing a set of cards within a piece of shelf-based equipment are shown together side by side to convey the fact that they represent cards forming part of the same shelf. An example of this is shown in FIG. 2d in which three card icons are displayed side by side. Using card icons instead of a node icon allows information for each card to be displayed independently.

The graphical representation may also include icons representing some of the components connected to the network which do not form part of the network. A simple pictorial icon may be used for these components. An example of a pictorial icon is given in FIG. 3 which shows a pictorial icon representing a terminal which may be a network management terminal, for example.

Figure 4A:
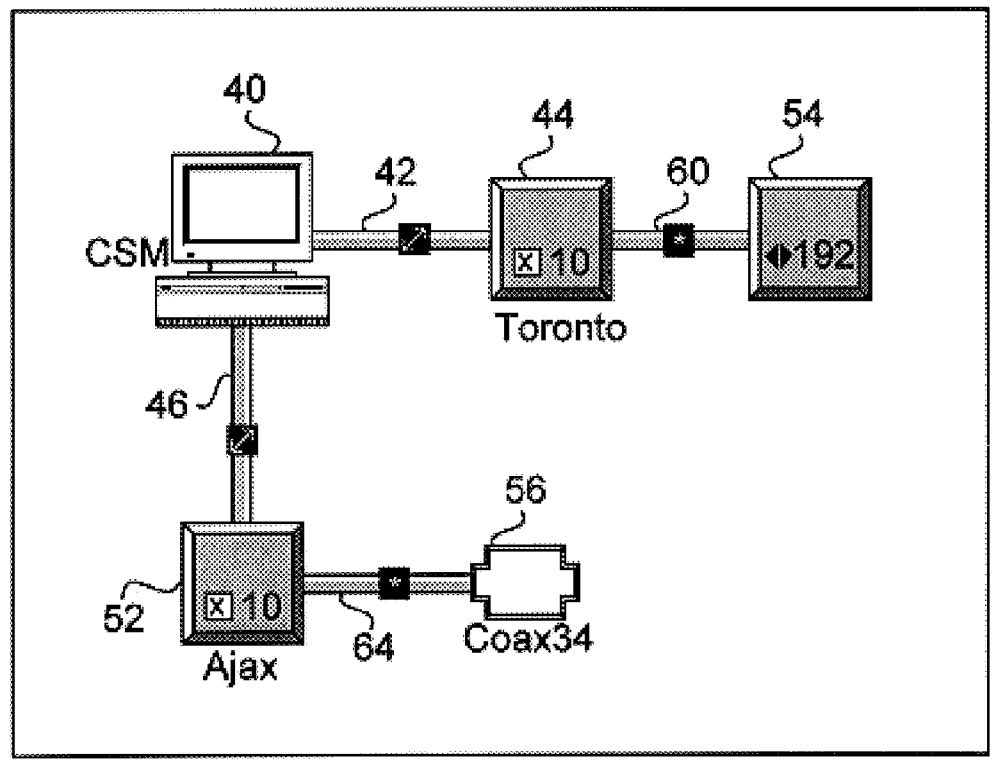
FIG. 4a is an example representation of a simple network using the symbols and icons of FIGS. 1 to 3.
Figure 4B:
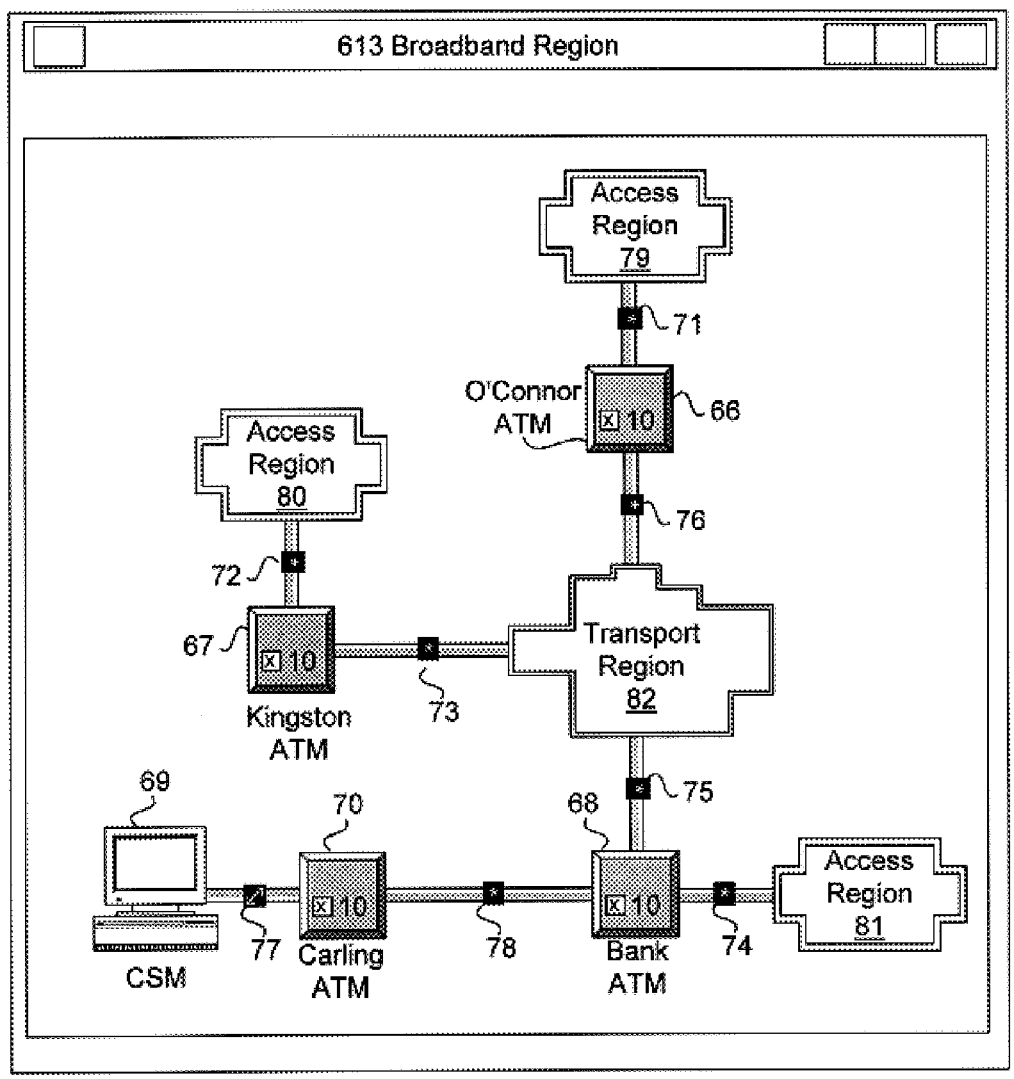
FIG. 4b is an example representation of a network including container icons.

By way of example, FIG. 4a shows the graphical representation of a very simple network which uses the above described basic icon shapes for nodes, and links. It includes a pictorial icon 40 for a workstation terminal connected with a first CNET link icon 42 to a node icon 44 and a CNET link icon 46 to another node icon 52. The node icons 44,52 are for two network elements identified as switch cross connects by the symbol 12 from FIG. 2e. Also shown are a node icon 54 for a network element identified as a transport ADM by the symbol 14 from FIG. 2e, and a symbolic node icon 56 for a coaxial node with link bundle icons 60,64 connecting these elements to node icons 44, 52 respectively. The node icon 56 for the coaxial node is an example of a symbolic node icon having a different shape.

Depending on the complexity of a given network, the graphical representation of the network may include only a subset of all of the objects in the network. There may still be too many objects in the network to be conveniently shown at one time in a graphical representation such as that shown in FIG. 4a. In order to simplify the display of the overall network, the objects may be grouped in various ways depending upon some user-defined criteria. The grouping of elements may be based on geographic and/or other administrative criteria, for example. Preferably flexible polygonal container icons are used to perform such a grouping function. An example of a graphical representation of a network in which several container icons have been used to simplify the display of the network is given in FIG. 4b. The graphical representation includes node icons 66,67,68,70, link bundle icons 72,73,74,75,76, and container icons 79,80,81,82. Each container icon "contains" a collection of network object icons. A container icon may also contain other container icons in addition to the normal network object icons. Functionality may be provided to allow the specifics of what a container represents to be determined by opening the container. This might expand the container icon to display the collection of network object icons or additional lower level container icons which it represents. Container icons may present information about themselves such as labels.

Figure 4C:
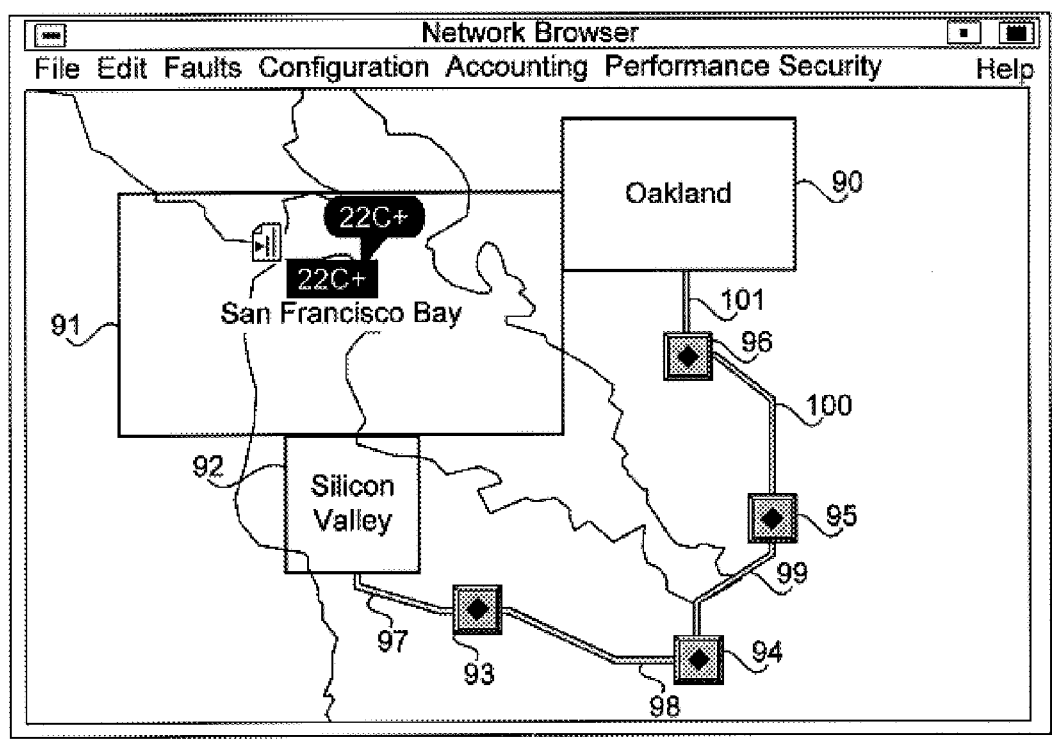
FIG. 4c is an example representation of a network including translucent container icons displayed over a map.

The shape of the container icon may be manipulated so that it conforms to specific geographic or other administrative requirements or criteria. The container icons may be displayed transparently or translucently over a map of familiar geography for improved recognition. Default flexible container colours are selectable by the network administrator. When they are created they are preferably translucent, having a muted colour such as grey-brown, grey-green, or grey-blue so as not to conflict with any of the alarm colours, as discussed below. An example of this is shown in FIG. 4c. Transparent container icons 90, 91, 92 are used to simplify or contain the portions of the network located in Oakland, San Francisco Bay, and Silicon Valley respectively. The container icons are transparently displayed over a map of the relevant geographical area. Also shown are a number of small square node icons 93,94,95,96 identified as transport nodes and links 97,98,99,100,101 connecting the transport nodes to each other and to the container icons. The use of container icons enables improved partitioning of the network to match any particular requirements. FIG. 4d shows an example of three polygonal containers labelled "Region A", "Region B" and "Region C" which have interlocking shapes which would be suitable to simplify the representation of non-overlapping groupings of network objects. Transparency of the containers enables overlapping and meshed regions of the network. As an example of meshed regions of a graphical network representation, a first container icon may contain a first set of network object icons, a second container may contain a second set of network object icons, and a third container may contain a set of network object icons which includes icons from each of the first and second sets. The complex relationships which exist in most of today's telecommunications networks often lend themselves to having their network objects grouped in various different overlapping ways and the use of container icons improves a user's ability to understand these complex relationships and groupings.

In the management of networks, and particularly telecommunications networks, a state model is used to provide a top level view of the network. In any such model, each network object can be in one or more of a large number of states and statuses. The states and statuses, and their definitions, and the allowed interactions between states are defined by each particular state model. The invention provides a graphical user interface which allows the visual depiction of very complex combinations of states. While the particulars of the invention can be adapted in many ways to any specific state model, a preferred embodiment of the invention provides a graphical representation of network objects such as nodes, cards and links and their states and statuses as defined by the current OSI model.

In the visual language provided by the invention, each network object is represented by a basic icon as discussed above. Each basic icon representing a network object can be in one of a number of base states. These base states are indicated primarily by an attribute imparted to the basic icon such as a different border, texture or perimeter. In addition, a set of modifier icons is provided which can be attached to the basic icon representing the network element to indicate supplementary state information. A modifier icon is an additional graphical symbol which is attached to or superimposed over a portion of the basic icon. A conversion between the states and statuses specified by a given state model and the base states and supplementary states provided by the graphical representation preferably maps the more frequently occurring combinations of states or statuses from the state model onto base states, and the less frequently occurring combinations of states or statuses onto supplementary states, thereby minimizing the required number of modifier icons.

The OSI model currently includes three state types, and at any instant in time, each object of the network is in three OSI states simultaneously, one state from each of the three state types. Each object has an Operational state which may be "Enabled" or "Disabled". Each object has a Usage state which may be "Busy", "Active" or "Idle". Each object has an Administrative state which may be "Unlocked", "Shutting down", or "Locked". The OSI states are summarized in the following table:

| State Type | States | Graphic Representation |
|---|---|---|
| Operational | Enabled | basic icon with imparted attributes |
| | Disabled | |
| Usage | Busy | |
| | Active | |
| | Idle | |
| Administrative | Unlocked | basic icon with modifier icons superimposed |
| | Shutting Down | |
| | Locked | |

Each icon representing a network object is displayed in such a manner that the three OSI states of that object can instantly be discerned. This is done by imparting an attribute and in some cases a modifier icon to the basic icon which reflects the OSI states. The preferred attributes and modifier icons imparted to the basic icon for the various state combinations are shown in FIGS. 5 and 6 for card icons and node icons. These same attributes and modifier icons are used with link icons, but these are not included in the Figures.

As shown in FIG. 5, the OUA (Operational, Usage, Administrative state combination) of (Disabled, Idle, Unlocked) is indicated by imparting an attribute to the icon consisting of a dashed border. The OUA of (Enabled,Idle, Unlocked) is indicated by imparting an attribute to the icon consisting of a solid border. The OUA of (Enabled,Active, Unlocked) is indicated by imparting an attribute to the icon consisting of a three dimensional border.

The OUA of (Enabled,Busy,Unlocked) occurs less frequently and is represented by the icon having the three dimensional attribute in combination with a modifier icon consisting of a black exclamation mark as shown in FIG. 6. The "Busy" usage state is conveyed with a modifier icon and is thus a supplementary state.

Each of the OUAs in FIG. 5 have an Administrative state of "Unlocked". The OUAs of (Disabled, Idle, Locked), (Enabled, Idle, Locked) and (Enabled, Active, Shutting Down) are indicated by the addition of a lock modifier icon as shown in FIG. 6. The Administrative state is conveyed through the use of modifier icons and is thus a supplementary state.

Combinations of OSI states which can be represented with icon attributes only, and without the requirement for any modifier icons are the base states referred to previously. The base states in the above described graphical representation are shown in FIG. 5 and consist of (Disabled,Idle, Unlocked), (Enabled,Idle,Unlocked), and (Enabled,Active, Unlocked). The particular graphical display attribute was chosen for each of these base states to convey an intuitive visual semantic meaning. A dashed border attribute was selected for the base state of (Disabled,Idle,Unlocked) due to the visual semantics communicated by dashed lines, namely that of being disabled; a solid border attribute was selected for the base state of (Enabled,Idle,Unlocked); and a solid 3D border attribute was selected for the base state of (Enabled,Active,Unlocked) to imply a "plump" node "full of activity or traffic". Since all three base states have the administrative state "Unlocked" the base states in the remainder of the text will be referred to simply as (Disabled, Idle), (Enabled, Idle), and (Enabled, Active) for brevity.

FIG. 7 shows the three base states for each of three types of network icon, namely a node icon, link icon, and card icon.

Referring back to FIG. 4a, the three dimensional borders of node icons 50,52,54,56 are indicative of the base state (Enabled, Active). Link icons 42,46,58,60,62,64 also each have a three dimensional appearance indicative of the base state (Enabled, Active).

In addition to the three state types, the OSI model includes five status types, these being Alarm, Procedural, Availability, Control and Standby. The possible statuses for each status type are summarized in the following table:

| Status Type | Statuses | Graphic Representation |
|---|---|---|
| Alarm | None | basic icon with |
|  | Critical | modifier icons |
|  | Major | superimposed |
|  | Minor |  |
|  | Under Repair |  |
|  | Outstanding or |  |
|  | Acknowledged |  |
| Procedural | None |  |
|  | Initialization Required |  |
|  | Not Initialized |  |
|  | Initializing |  |
|  | Reporting |  |
|  | Terminating |  |
| Availability | None (available) |  |
|  | In Test |  |
|  | Failed |  |
|  | Power Off |  |
|  | Off Line |  |
|  | Off Duty |  |
|  | Dependency |  |
|  | Degraded |  |
|  | Not Installed |  |
|  | Log Full |  |
| Control | None (unrestricted) |  |
|  | Subject to Test |  |
|  | Partly Locked |  |
|  | Reserved to Test |  |
|  | Suspended |  |
|  | Standby |  |
|  | Providing Service |  |
| Standby | Providing Service |  |
|  | Hot Standby |  |
|  | Cold Standby |  |

Unlike the OSI states, a network object does not necessarily have a status from each status type, and in many cases will have no statuses at all. In the graphical representation of the network, which statuses of the five status types, if any, that apply to a given network object are represented by modifier icons. Each modifier icon is intended to be a visual metaphor for the status it is representing. Note that in the OSI model, a given status may occur simultaneously with only certain combinations of states. In the present context, this means that a given status may occur simultaneously with only certain base states. How modifier icons are used to represent the Procedural status, Availability status, Control status, and Standby status is illustrated in FIGS. 8 to 11 respectively. How the statuses illustrated in FIGS. 8 to 11 may be combined is illustrated in FIGS. 12 to 15. How modifier icons are used to represent the Alarm status is illustrated in FIGS. 16 to 19.

It is noted that in the particular OSI implementation of the invention described herein, operational and usage states are indicated by imparting attributes to the basic icon. Administrative states and all the OSI statuses are indicated using modifier icons superimposed on the basic icon graphic. As mentioned previously, the state and status information conveyed through the use of attributes is referred to herein as base state information, and the state and status information conveyed through the use of modifier icons is referred to herein as supplementary state information. In this particular embodiment, the network management terminal receives the network management information initially in the form of OSI state and status information and performs a state set conversion, converting the OSI states and statuses into base states and supplementary states for each network object. Once the base states and supplementary states for each network object have been determined, the attributes and modifier icons which must be added to the basic icons are also known. More generally, an icon attribute may be used to display a base state selected from a set of base states, each base state representing a state, a status or a combination of states and statuses, and modifier icons may be used to display a set of supplementary states, each supplementary state representing a state, a status or a combination of states and statuses. In some cases it may be appropriate to map the network management information directly onto base states and supplementary states eliminating the requirement of performing a state set conversion.

Referring now to FIGS. 8 to 11, in each of the illustrated examples, the modifier icon is shown as it might be applied to both a node icon and a card icon. Some textual description of the various statuses is also provided in the figures where appropriate.

FIG. 8 shows how modifier icons may be used to represent the Procedural status for each of the three base states. In the case in which there is no Procedural status, no modifier icon is required. The Procedural status "Initialization Required" can occur only for the base state (Disabled, Idle) and is represented by a modifier icon consisting of a hand with an upward pointing solid triangle. A modifier icon consisting of three upward pointing solid triangles is used to represent the Procedural status "Initializing" for either of the base states (Disabled, Idle) or (Enabled, Idle). A modifier icon consisting of three downward pointing solid triangles is used to represent the Procedural status "Terminating" for any of the three base states. A modifier icon consisting of two upward pointing triangles and a small bar graph is used to represent the Procedural status "Reporting" for either of the base states (Enabled, Idle) and (Enabled, Active). In this example, the Procedural status is supplementary state information since it is displayed through the use of modifier icons.

FIG. 9 shows how modifier icons may be used to represent the Availability status for each of the three base states. In the case in which there is no Availability status, no modifier icon is required. A bar graph modifier icon is used to represent the Availability status "In Test" for the base state (Disabled, Idle). A broken stick modifier icon is used to represent the "Failed" Availability status for the base state (Disabled,Idle). An unplugged modifier icon is used to represent the Availability status "Power off" only for the (Disabled, Idle) base state. A clock modifier icon is used to represent the "Off Duty" Availability status for the base states (Disabled,Idle) and (Enabled,Idle). To indicate the Availability status "Degraded" a grey exclamation point modifier icon is used for either of the base states (Enabled, Idle) or (Enabled,Active). Recall that a black exclamation point modifier icon was used to indicate the usage state "Busy". Finally, the Availability status "Not Installed" is shown for the (Disabled,Idle) base state by adding hatch lines to the icon.

FIG. 10 shows how modifier icons may be used to represent the Control status for each of the three base states. The "Subject to Test" Control status is represented by a bar graph modifier icon for each of the base states (Enabled,Idle)

and (Enabled,Active). The "Reserved for Test" Control status is represented for any of the three base states by a modifier icon consisting of a bar graph with a lock.

FIG. 11 shows that modifier icons may be used to represent the Standby status for each of the three base states. A node which has a primary and a backup unit is illustrated by two node icons one of which is behind the other. The icon in the foreground relates to the primary unit and may be referred to as a primary icon, while the icon in the background relates to the backup unit and may be referred to as a backup icon. A card having a primary and a backup unit is indicated by a card icon with a pair of overlapping rectangles, namely a primary rectangle and a backup rectangle, symbolic of the redundancy.

For node icons, the status of the backup unit is indicated by the border of the backup icon. The Standby status can be either "Providing Service" which corresponds to the backup unit having a base state of (Enabled,Active) and is illustrated by a solid backup icon, "Hot Standby" which corresponds to the backup unit having a base state of (Enabled,Idle) and is illustrated by the backup icon having a solid border, and "Cold Standby" which corresponds to the backup unit having a base state of (Disabled,Idle) and is illustrated by the backup icon having a dashed border.

For card icons, both rectangles being unshaded is indicative of "Cold Standby". The "Hot Standby" status is indicated by the primary rectangle having a shaded appearance with respect to the backup rectangle. The "Providing Service" status is indicated by switching the places of the two rectangles, shading the backup rectangle black and by writing the symbol "2" within the backup rectangle to indicate that it is the backup card which is providing service.

There may be a need to show concurrent states or statuses. This can be achieved by listing the appropriate modifier icons on the icon. FIG. 12 shows several examples of this in row 160. Also shown in FIG. 12 in row 162 is an alternative to showing a large number modifier icons, wherein an information modifier icon is used to draw the user's attention to a change in the state or status. By clicking on the information icon, detailed information is then displayed.

In the above described embodiment, modifier icons are positioned at the top of the network node icons. This positioning is somewhat arbitrary and could vary based on the particular object identified by the node icon according to any number of predetermined criteria. For example, they could be positioned so as to avoid overwriting the node identifier, support more than one simultaneous icon, make the icons appear as separate and selectable objects, avoid overwriting the alarm count, or maintain some consistency with the alarm strategy.

Figure 13:
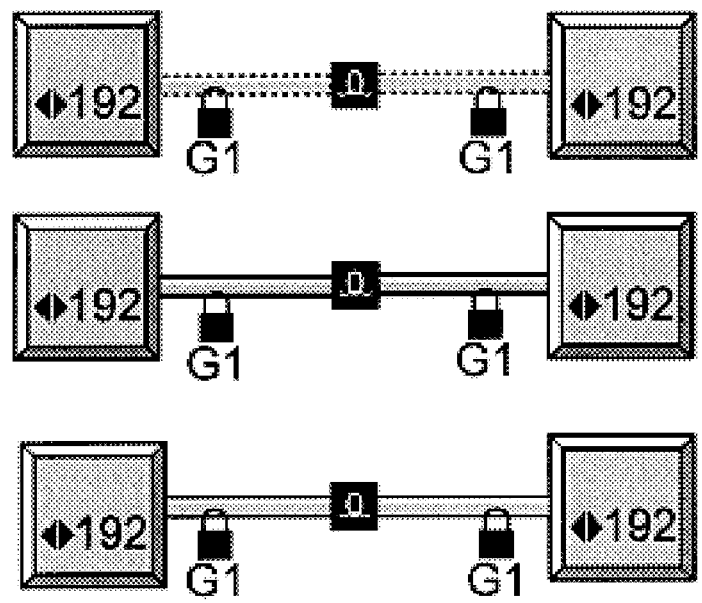
FIG. 13 illustrates the positioning of modifier icons on link icons.

FIG. 13 shows an example of how modifier icons might be positioned on a link icon for a link in each of the three base states. Two lock icons are shown indicating that the link has been administratively locked for both transmit and receive. Other positions for the modifier icons on link icons are possible.

Figure 14:
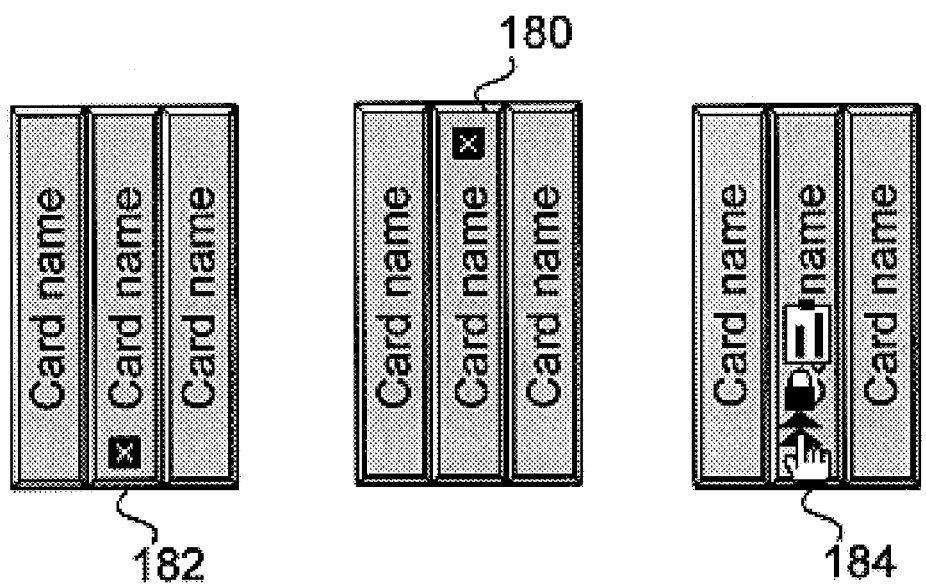
FIG. 14 illustrates the positioning of modifier icons on card icons.

Modifier icons can be positioned anywhere on a card icon depending on the physical layout of the equipment. If the card has distinguishing characteristics such as lights, they should be shown on the icon in their correct position to give the craft and network operator a common reference point when they are communicating. As a result, modifier icons should ideally be positioned in locations that would not obliterate these distinguishing characteristics. FIG. 14 shows distinguishing characteristics at both the top 180 and bottom 182 of the card and also shows a series of modifier icons 184 on a card.

Figure 15:
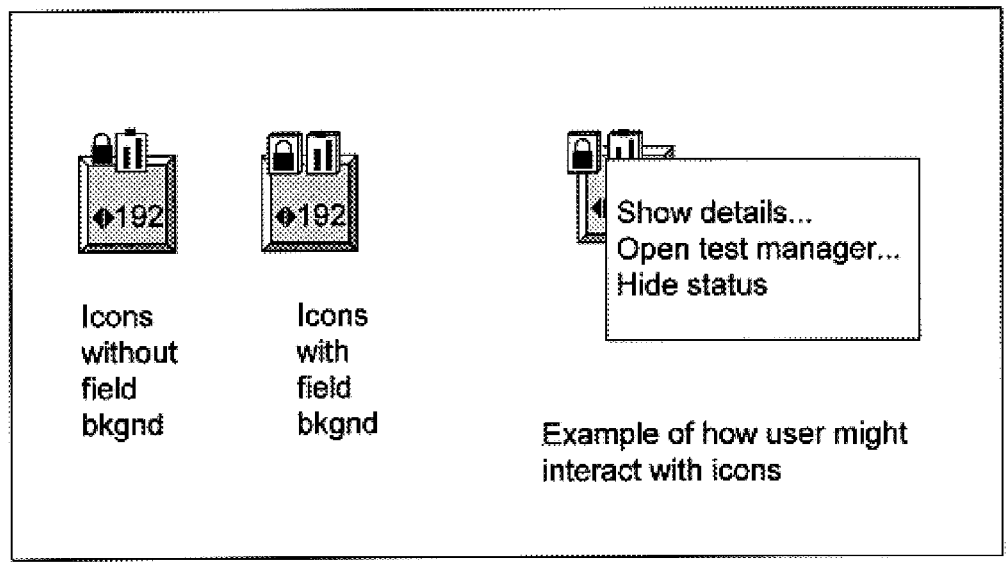
FIG. 15 illustrates an example of a selectable modifier icon.

In some cases, it may be advantageous to make particular modifier icons selectable so as to provide access to further information. An example of this is shown in FIG. 15 which includes a bar graph modifier icon indicative of the Availability status "In Test". The bar graph modifier icon is selectable to provide access to a menu which in the illustrated case includes the options "Show details", "Open test manager", and "Hide Status".

Referring now to FIGS. 16 to 19, a comprehensive strategy for conveying detailed OSI alarm status information will be described. An alarm is an event status generated by a network object which may indicate that some sort of irregular condition has occurred, and that test and repair work may be required. In the OSI model, there are alarm types having three different levels of severity. These OSI alarm severities are "Critical", "Major", and "Minor" and are abbreviated by the letters "C", "M" and "m" respectively.

FIG. 12 shows modifier icons are used to represent the Alarm status for each of the three base states. A "New" alarm is an alarm for which no acknowledgement or action of any kind has been taken. The existence of New alarms is signalled by a bubble modifier icon with "abbreviated alarm text" written therein indicating the number and the severity the New alarms. Abbreviated alarm text in the alarm bubble contains a count of the highest severity new alarms only. The bubble modifier icon and the basic icon are also coloured to draw attention to them, and to reflect the severity of the alarm, where the colours yellow, orange and red are used to indicate increasing severities minor, major, and critical respectively. Thus a basic icon coloured orange with an orange bubble modifier icon with the abbreviated alarm text "1M" written therein means that one New Major alarm has occurred. The presence of one New Major alarm is shown in FIG. 12 for the (Enabled,Idle) 120 and (Enabled,Active) 122 base states for each of a card icon and a node icon. Note that the Figures are in black and white, and as such the colouring actually used to display alarms cannot be shown.

Once an alarm has been acknowledged, it becomes an Outstanding alarm rather than a New alarm. When there are no New alarms, the bubble modifier icon is removed, and the basic icon including its border is recoloured its normal shades of grey. Outstanding alarms are indicated by the presence of an additional outline surrounding the border of the basic icon, with the colour of the additional outline matching the colour associated with the severity of the highest-severity alarm. The outline is displayed so as not to interfere with the border already displayed. This allows the border and outline to convey different information. Abbreviated alarm text indicating a count of the highest severity alarms, both new and outstanding, is written within the icon itself. An example of the appearance of the icon with one Outstanding Critical alarm 124,126,128 is shown in FIG. 16 for each of the three base states. Each of the icons 124,126, 128 has an additional red coloured (dark shade as illustrated) outline surrounding it and has the text "1C" written within it indicating the presence of a single outstanding Critical alarm. There may be New and Outstanding alarms at the same time. In this case, the bubble modifier icon and the abbreviated alarm text in the bubble together with the colour of the bubble and basic icon (including the border) will indicate the New alarms, and the outline surrounding the basic icon will indicate the highest severity of Outstanding alarms.

After an alarm has been acknowledged, and some repair work has been instigated, the alarm status "under repair" is used to indicate this to be the case. The alarm status "Under Repair" is indicated by a "hand" modifier icon. When the hand modifier icon is applied, the additional outline surrounding the basic icon is removed assuming that no additional outstanding alarms exist.

In addition to the three OSI alarm severities of minor, major, and critical, the preferred embodiment of the invention includes two additional alarm severities, namely "Warning" and "Unknown". A comprehensive display of how each severity of new alarm would appear on a container icon, a node icon, a link icon, and a card icon is shown in FIG. 17. In each example, one alarm of the indicated severity is new, as indicated by the bubble. The total number of the highest severity alarms is written within the icon. In this case, the total number is the same as the number of New alarms meaning that there are no outstanding alarms. In the case of container icons, the alarm indications reflect the sum of the most severe of the alarms pertaining to the network objects contained by a given container icon. Thus, if four different network elements contained within a container each experienced one New Critical alarm, then the alarm bubble would contain the abbreviated alarm text "4C" indicating that the container has four new Critical alarms.

The presence of additional alarms which have a severity lower than that of the highest severity is indicated by appending a "+" to the abbreviated alarm text. If the additional alarm is new, the "+" will be appended to the abbreviated alarm text appearing in the bubble modifier and to the text appearing on the icon itself, while if the additional alarm is outstanding, then the "+" will only be appended to the abbreviated alarm text appearing on the icon itself.

As indicated above, an outstanding alarm is also shown symbolically by adding an additional outline around the icon. Once the condition that caused an alarm is removed, for instance, once the corresponding fault is under repair, that alarm is no longer outstanding. When this occurs, the additional border around the icon is removed, and the abbreviated alarm text is updated to reflect the new condition. FIG. 18 illustrates in row 140 the appearance of several icons each having one outstanding critical alarm and at least one outstanding alarms of lesser severity as indicated by the abbreviated alarm text "1C+" and the red (dark) border. In row 142 of FIG. 18, similar icons are shown after the "under repair" modifier icon has been added.

FIG. 19 illustrates a typical sequence of icon appearances for an example alarm scenario. First, a single new critical alarm occurring at a node is indicated by a red (dark) modifier icon bubble containing the text "1C" and by the basic icon being shaded red (dark) (A). Since the total number of both New and Outstanding alarms is also one, the text "1C" also appears inside the node icon. The node has a base state of (Enabled,Active) as indicated by the three dimensional appearance of the icon. In (B), the alarm has been acknowledged and becomes an outstanding alarm. This is indicated by the removal of the bubble icon modifier, by the red outline surrounding the node icon, and by the text "1C" remaining inside the node icon. The colour of the node icon has returned to normal, and the base state is still (Enabled,Active). In (C) the node is still in the base state (Enabled,Active) but has the Administrative state "Shutting Down" as indicated by the lock modifier icon. In (D) the base state has changed to (Enabled,Idle) as indicated by the non-three-dimensional appearance of the icon. For this base state, the lock modifier icon signifies the Administrative state is "Locked". In (E) the base state has changed to (Disabled,Idle) as indicated by the icon's border being dashed. In (F), the solid red outline has been removed indicating that the critical alarm is no longer outstanding.

The hand modifier icon indicates that the network element has the Alarm status "Under Repair". The abbreviated alarm text has been removed from the icon in this case. In (G) an additional modifier icon has been added to indicate the "In Test" Availability status.

In addition to the graphical representation of the alarms, Alarm manager window(s) may be provided which present a textual tabular summary of the alarms present on a particular set of network objects. Each network object included in the table has a record which summarizes the alarms for that network object.

In the embodiment described above, exemplary base state icon attributes and supplementary state modifier icons have been used to represent a all of the states, and a subset of the statuses provided in the OSI model. Additional modifier icons (not shown) may be assigned to the remaining statuses so as to provide a complete graphic representation of the entire OSI model.

Figure 20:
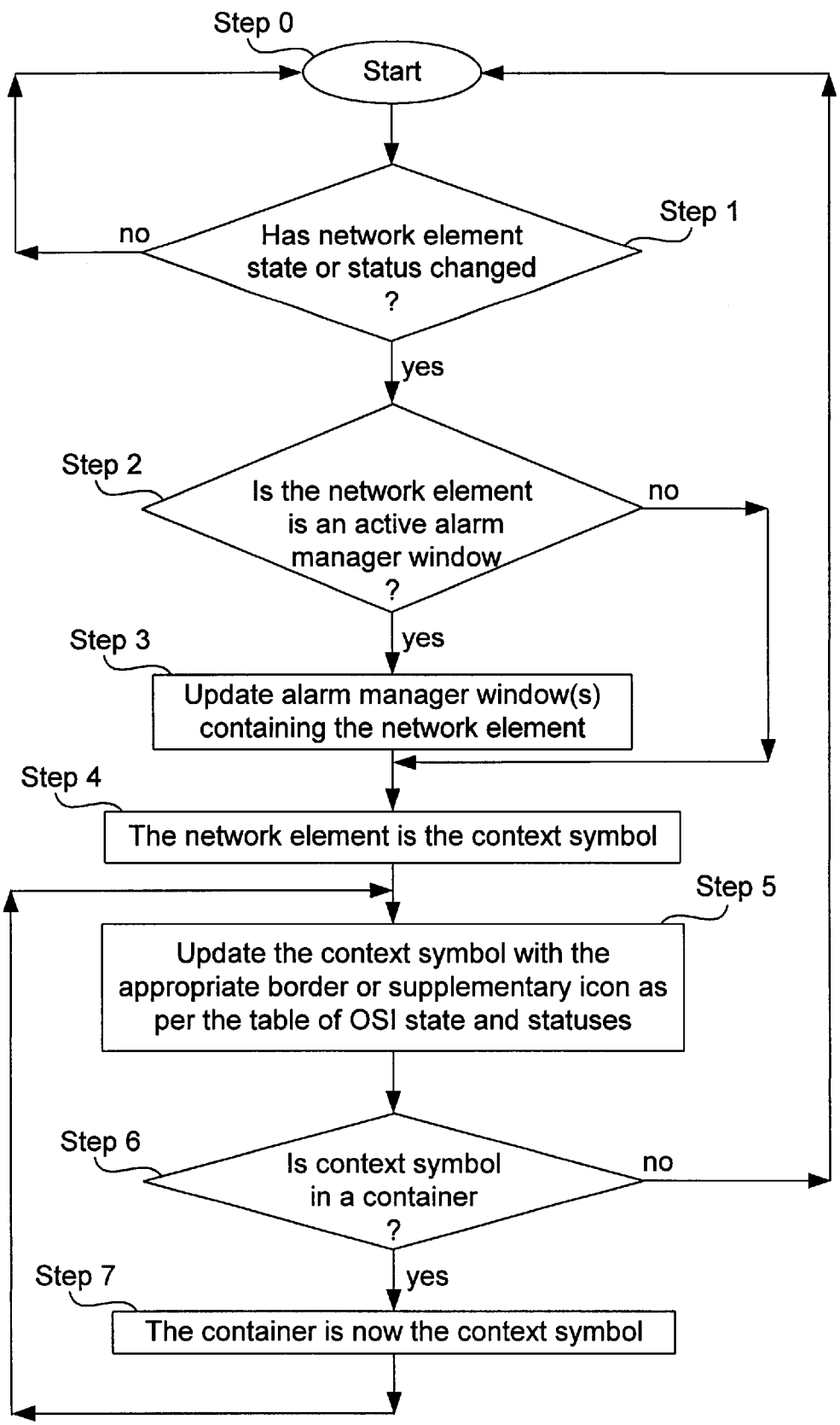
FIG. 20 is a flowchart for the steps taken to update the states and statuses depicted in a graphical representation of a network.

In FIG. 20, a flowchart is shown of the logic followed by the GUI in updating displayed state and status information when a change in a state or status occurs for any network object forming part of a network being graphically represented according to the invention. At step 0, it is assumed that the initial states and statuses of the network objects are known. In step 1, a check is made to see if a change in a state or a status for any network object has occurred. If not, then no action is required. If a change for a specific network object has occurred, then in step 2 a check is made to see if that network object is included in an active alarm manager window. If the network object is included in an active alarm manager window, then the record in the alarm manager window for that network object is updated to reflect the new state and status information. At this point, whether or not the basic icon for the specific network object is displayed or not, the basic icon is defined as a "context symbol" in step 4. A basic icon is the first level of context symbol. A container icon containing a basic icon is the next level of context symbol. A container containing a container is the next level of context symbol and so on. Steps 5, 6, and 7 are now repeated for the various levels of context symbol. In step 5, the context symbol which may be a basic icon or a container icon, is updated with icon attributes and modifier icons to reflect the modified state and status information. Of course, in some cases, the particular context symbol may not be included in what is currently being displayed. For example, if the basic icon is within a container icon, then it will not be displayed. However, the state and status information for the basic icon is still updated but with no immediate effect upon the graphical representation until the basic icon is actually displayed. In step 6, if the context symbol is not within a container, then the processing of that event finishes. Otherwise, the container containing the context symbol is redefined as the context symbol, and steps 5,6,7 are repeated as necessary. Container icons include alarm information consisting of alarm modifier icons and text, but do not in general include the remaining state and status modifier icons and attributes, these only being displayed on the relevant basic icon. The only difference in updating the alarm information for a container icon as opposed to a basic icon is that a container icon reflects the sum of the worst alarms outstanding for all of the basic icons or container icons within it.

The initial graphical representation of the network is set up by a chief administrator using a GNE (Graphic Network Editor) screen which is used to define the position of network objects against their background. Normal users of the network management tool access the GUI via a GNB (Graphic Network Browser). The GNE is used to make configuration changes as the network evolves and as network elements are added or removed. A configuration of workstations to monitor a network using the GUI according to the invention will typically consist of at least one terminal, though for large networks a more typical application of the invention will have several workstations running the GUI concurrently to allow many operators to share the effort of surveillance of the network. Whether on a single screen or multiple ones, the setup of the view presented to the operators is done by the chief administrator using the GNE.

The GNE provides the chief administrator with a basic graphic editor (not unlike many PC drawing packages) and the following capabilities:

provide a top level view GUI of the network;
  the ability to create sub levels of the top level to enable partitioning the nodes or containers representing the network into logical sub groupings as required;
  import as many background images (such as maps of cities, countries or building floor plans) as will be required to provide a frame of reference in the various GUI levels;
  auto-discovery so that any new elements added to the network pop up automatically in the top level of the GNE;
  auto-discovery may also include the automatic definition of the element type;
  the ability to create flexible containers in any of the levels in the GNE (the definition of the shape of these containers being set by typical graphical editing techniques: clicking and dragging a mouse to define the shape on top of the background);
  the ability to drag and drop (via a mouse) network elements into containers and reposition the network elements to meaningful locations against the background;
  the ability to assign a name (text label) to network elements and containers as well as assign names to each level or window in the GUI;
  the ability to define how many GNB users there will be and for each user which views of the network GUI will be accessible;
  the basic set of GUI symbols and objects as defined by the invention with their associated attributes to represent network elements, links between elements and different containers.

Once the initial setup is made, the GNE's main function is to (re)position network icons and container icons if the network is reconfigured in any way. For instance as new network objects are added and pop up in the GNE's top level view, they need to be situated in an appropriate location relative to the existing network object icons. Otherwise with an unchanging network configuration, the GNB views are used to monitor the network and the GNE is likely inactive.

With the network configuration and views laid out by the GNE all users of the invention access the network management tool via their GNB windows. The layout and content of windows and containers is not modifiable by users from the GNB. The GNB provides the user with a standard windows like means of navigating through the levels (to open or close or select which view to bring to the forefront or to "drag" and reposition a window on the workstation screen).

An example scenario using the network management GUI according to the invention running on a network management workstation equipped with the capabilities described above will now be described with reference to FIGS. 21a–21f. In the example scenario which follows, a network is shown which is still growing. A large amount of configuration activity is ongoing, and the network is experiencing some troubles.

Figure 21A:
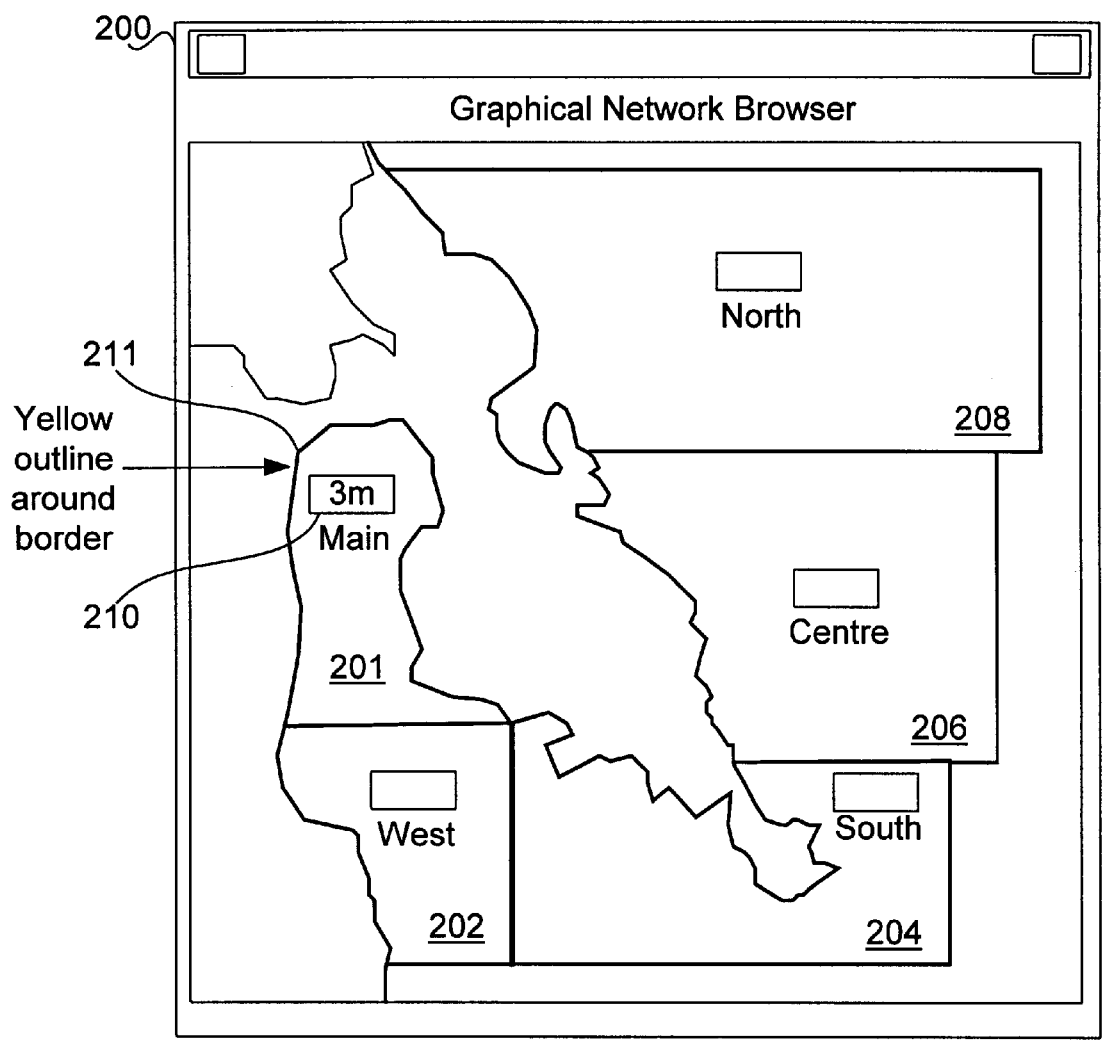
FIG. 21a–21f illustrate an example usage scenario.

Referring firstly to FIG. 21a, shown is a top level graphical representation of a network presented in a GNB (graphical network browser) window 200 on a display of the network management workstation. In this view, there are five regional container icons 201,202,204,206,208, labelled "Main", "West", "South", "Centre" and "North" respectively. In this top level view, no individual network objects are shown. In the Main container icon 201, there is written the abbreviated alarm text "3m" 210. This indicates that there are three minor alarms which have occurred within this container. The fact that there is no alarm bubble modifier icon signifies that the three minor alarms have all been acknowledged. A yellow outline 211 surrounds the border of container icon 201 also indicating the existence of acknowledged minor alarms.

Figure 21B:
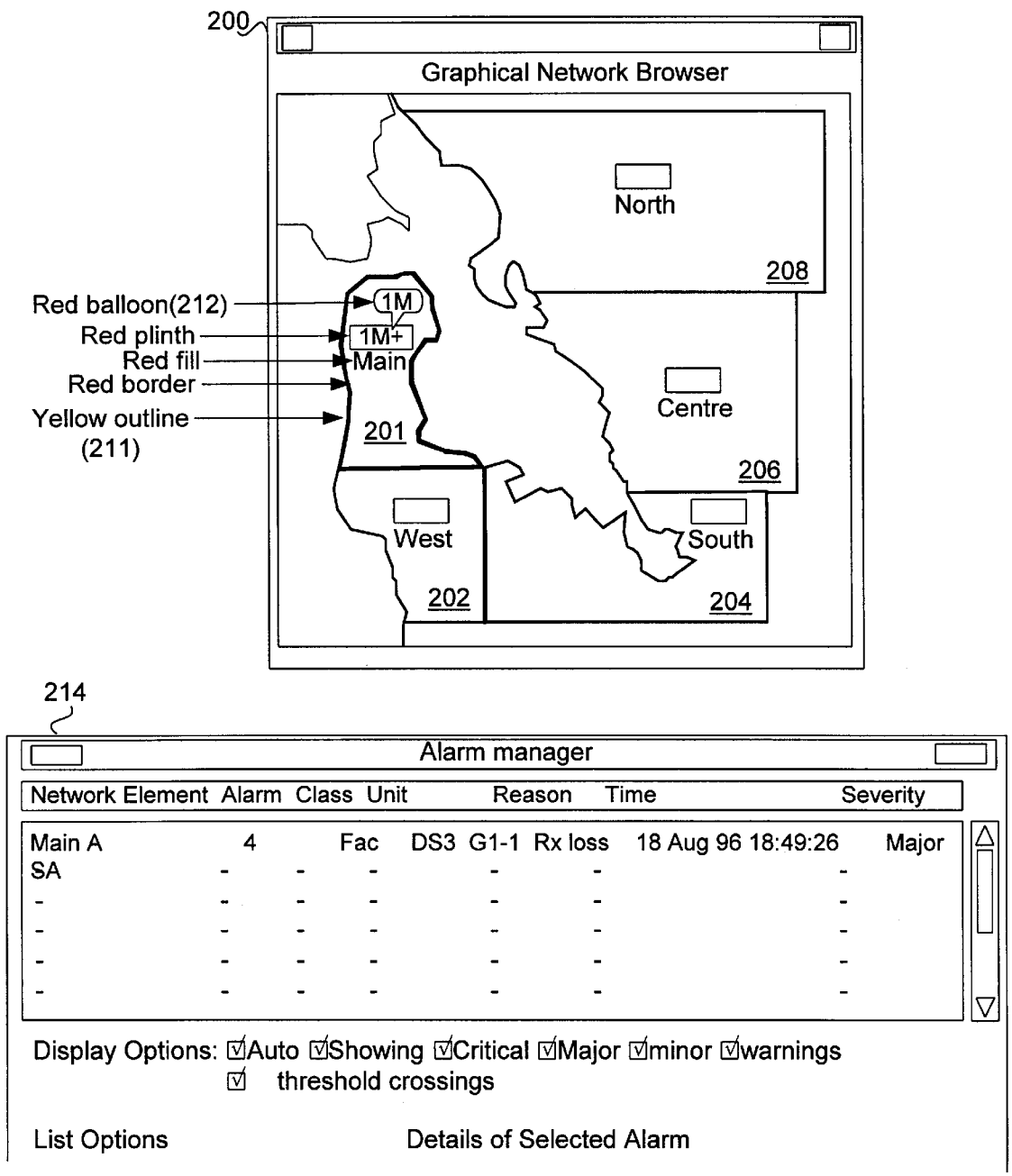

In FIG. 21b the Main container icon 201 is coloured red, and a red bubble modifier icon 212 has been added containing the abbreviated alarm text "1M". This indicates that a new major alarm has been detected. The abbreviated alarm text within icon 201 has been updated to "1M+" where the "+" indicates that there are outstanding alarms of lesser severity than major. The yellow outline 211 is also still shown. Also shown is an Alarm Manager window 214 which is displayed as a result of the operator double clicking on the alarm balloon 212. A single click would have produced a menu with a number of items including the Alarm Manager. The Alarm Manager window 214 contains further details of the new major alarm. The operator decides to look at the network details, and does this by double clicking on the Main container icon 201 to open it.

Figure 21C:
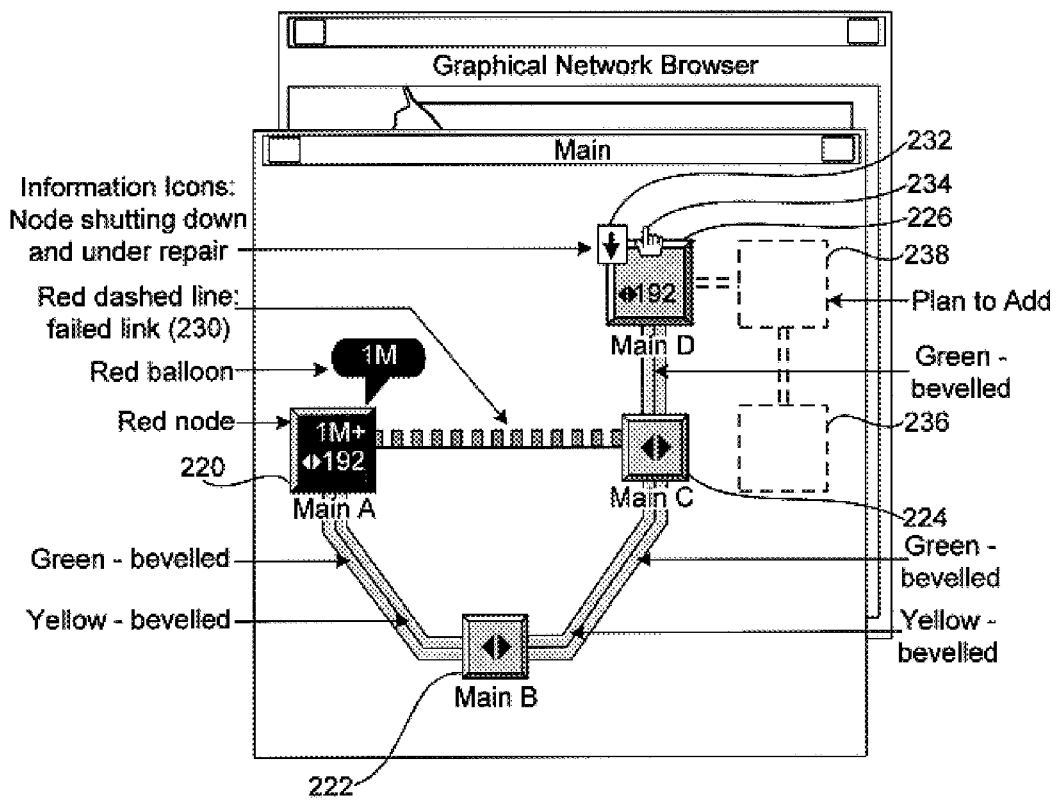

In FIG. 21c the GUI display after the operator has double clicked on the Main container icon 201 is shown. A new window 216 titled "Main" displays the details of the network elements contained by the Main container icon 201. These include four nodes icons 220,222,224,226 labelled "Main A", "Main B", "Main C", and "Main D" respectively and several links icons connecting them. Now the particular node icon 220, Main A, which produced the alarms previously displayed in the top level view of FIGS. 21a and 21b is displayed in red along with the red alarm balloon.

Additional information contained in the Main display window 216 shown in FIG. 21c includes the fact that a link 230 connecting Main A to Main C has failed as indicated by its red dashed appearance. Modifier icons 232,234 are attached to the Main D node icon 226 as a result of a previous operator action. These modifier icons 232,234 show that the node has been manually set to shut itself down, and is under repair respectively. Two nodes icons 236,238 are also shown which are in a "plan to add" state. These nodes have been installed, but have yet to be configured as part of the network.

Figure 21D:
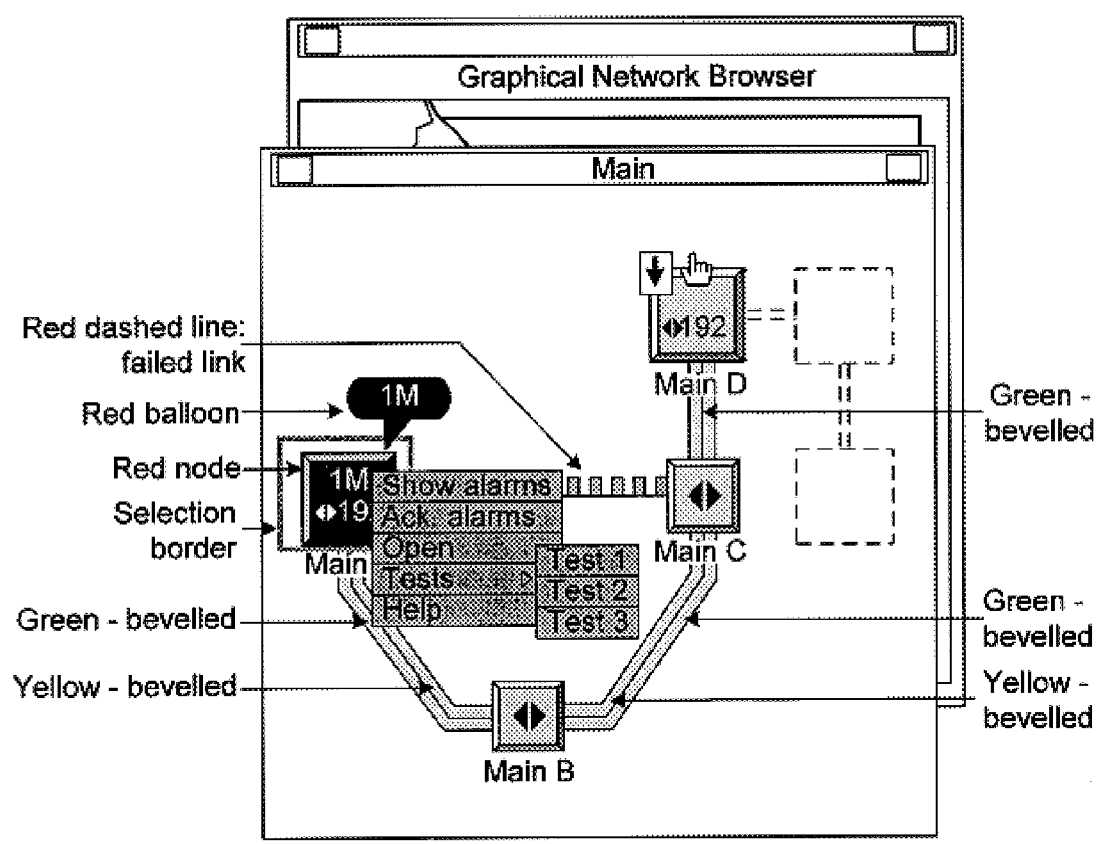
Figure 21E:
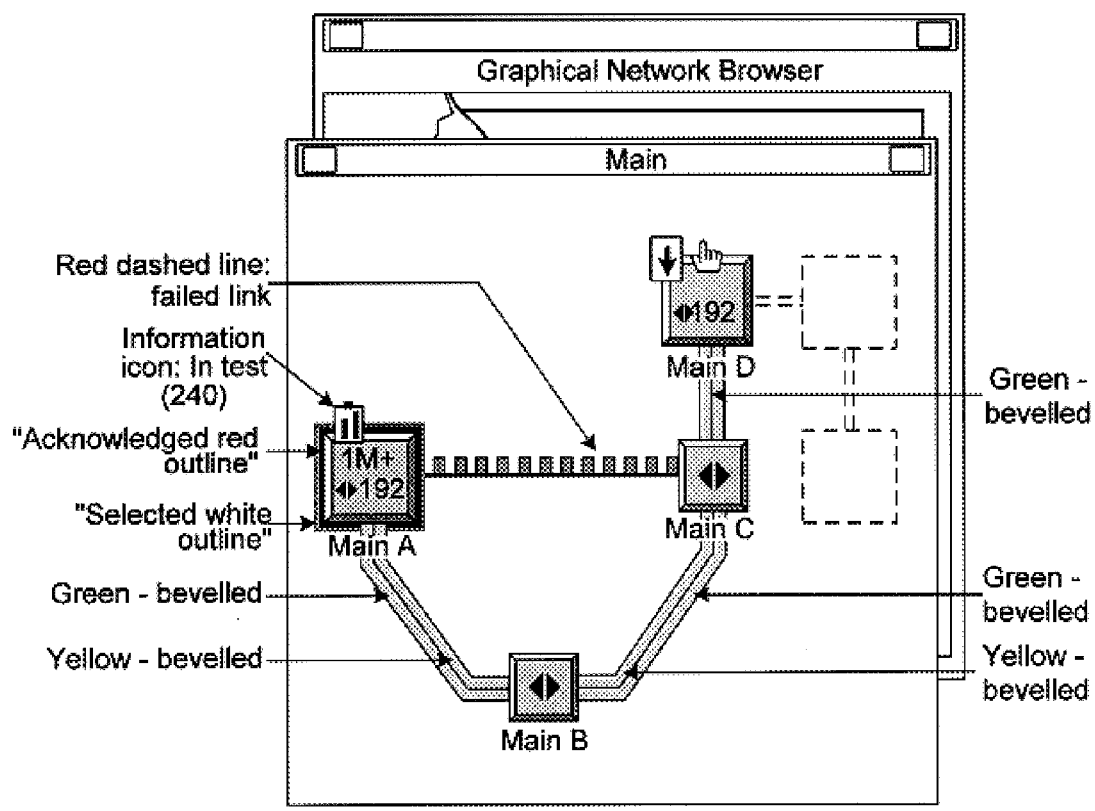

The next step in the scenario is for the operator to further investigate the source of the alarm. An operator can select a test to be run on the node which produced the alarm. In FIG. 21d, the operator has selected node icon 220 and then selected "Test 1" from a "Tests" menu. The effect of this is for an "in test" modifier icon 240 to be attached to the node icon 220 as shown in FIG. 21e. When the test is complete, the modifier icon changes to inform the operator that this is the case. This may include an indication that physical repairs are required. If physical repairs are required, then the operator can dispatch field personnel to complete them. When the repairs are completed, the equipment would then perform a self test to confirm normal operating conditions, and would report this to the network management workstation.

Figure 21F:
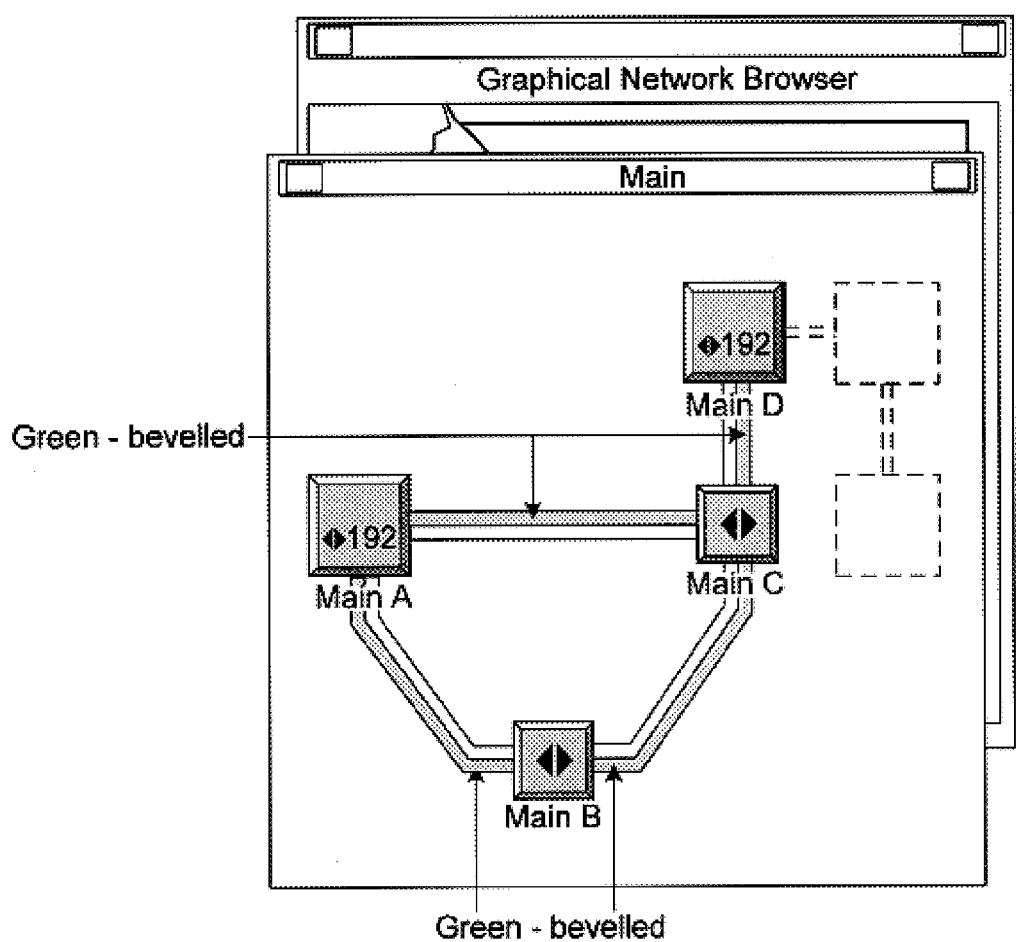

In FIG. 21f, all of the equipment in the Main window has been restored to a normal state as indicated by the lack of any abnormal colours, modifier icons, outlines, abbreviated alarm text etc. This completes the example scenario.

Numerous modifications and variations of the present invention are possible in light of the above teachings. It is therefore to be understood that within the scope of the appended claims, the invention may be practised otherwise than as specifically described herein.

While a symbol set which includes ITU-T symbols has been used to identify network elements on the icons, alternative symbol sets could be used, or the shape of the icon itself could be used.

While particular shapes for the node and link icons have been used in the illustrated and described examples, other shapes could be used with equal effect.

Modifier icons have been described which have particular shapes and positions, but clearly alternative shapes and positions could be used, so long as each modifier icon is clearly associated with a particular basic icon which represents a network object, and so long as the information intended to be conveyed by the modifier icons is clearly visually discernable.

A particular strategy for dealing with alarms has been described in the preferred embodiment consisting of a combination of alarm bubble modifier icons, abbreviated alarm text, shading the bubble and basic icon, and displaying outlines around the basic icon. While particularly appropriate for the OSI alarm states, this strategy could be applied equally well to other alarm state definitions. Alternative methods for representing this alarm information could also be employed.

Figure 22:
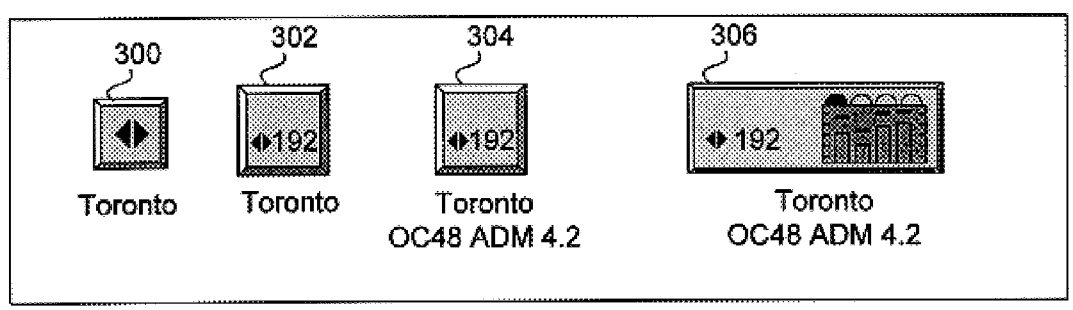
FIG. 22 illustrates node icons which may be expanded to display additional information.

In some cases, information in addition to the state and status information needs to be made available to the operator. The node icons may be expanded to a size appropriate for displaying the information required. An example of this is given in FIG. 22. A basic node icon 300 for a transport node is shown, and further identified by its location in Toronto. In order to identify the capacity of the transport node, expanded node icon 302 is used. Further details are given with node icon 304, where no expansion of the icon was required. In order to display performance statistics or traffic behaviour, for example, expanded node icon 306 may be used in which the relevant graphical information is included within the boundaries of the expanded node icon. This provides a convenient way to map this additional information onto a physical view of the network in an easily comprehendible way.

Although the invention has been described as applied in a particular way to represent the OSI standard, the scope of the invention includes other ways of representing the same OSI standard and other standards such as the BellCore requirements. The primary and secondary states specified in the BellCore requirements are summarized in the following table:

| Primary State | | Primary State Qualifier | |
|---|---|---|---|
| IS | in service | NR | normal |
| | | ANR | abnormal |
| | | RST | restricted |
| | | ANRST | both ANR and RST |

-continued

| | | | |
|---|---|---|---|
| OOS | out of service | AU | autonomous OOS |
| | | MA | management OOS |
| | | AUMA | both AU and MA |
| | | AURST | AU and RST |
| | | MAANR | MA and ANR |
| Secondary State | | | |
| ACT | | active | |
| AINS | | auto in service | |
| BUSY | | no spare capacity | |
| COMB | | sharing mate's load | |
| DGN | | diagnostic | |
| EX | | service affecting exercise | |
| FAF | | supporting facility OOS | |
| FEPO | | far end processor OOS | |
| FLT | | faulty | |
| IDLE | | no users but ready | |
| IDLERCV | | connected to transmit but not to receive | |
| IDLETRMT | | connected to receive but not to transmit | |
| INHIP | | inhibit in progress | |
| LPBK | | loopback in progress | |
| MEA | | mismatch of equipment and attributes | |
| MON | | reached abnormal threshold | |
| MT | | manual OSS for maintenance | |
| MTCLEIMD | | maintenance limited due to defect | |
| OVFL | | overflow | |
| PMI | | performance monitoring inhibited | |
| PPS | | pre-post service | |
| PRI | | protection release inhibited | |
| PSE | | protection switch exercise in progress | |
| PWR | | abnormal power condition | |
| RAR | | rearrangement in progress | |
| RDLD | | red lined | |
| SDEE | | supported entity exists | |
| SGEO | | supporting entity outage | |
| STBYC | | cold standby | |
| STBYH | | hot standby | |
| STBYI | | standby inhibited | |
| SWDL | | software downloading | |
| SWTCH | | switching system activity caused OOS | |
| SWTI | | software transfer inhibited | |
| SWUL | | software upload in progress | |
| TRD | | transferred load to mate | |
| TRMB | | terminate both | |
| TRMF | | terminated from | |
| TRMT | | terminated to | |
| TS | | test in progress | |
| UAS | | unassigned | |
| UEQ | | unequipped | |
| WRK | | working | |

In applying the invention to the representation of the primary and secondary states of the BellCore standard, it would be preferred that the base states be used to represent the primary state information, and that modifier icons be used to represent the secondary state information.

The embodiments of the invention in which an exclusive property or privilege is claimed are defined as follows:

1. A processor implemented method for displaying information relating to a telecommunications network consisting of a plurality of network objects using a networks management terminal having a display, the information consisting of base state and/or base state and supplementary state(s) information for at least one of the network objects, the method comprising the steps of:
 defining a unique attribute representative of each base state, the attribute being unique independent of colour;
 defining a unique modifier icon representative of each supplementary state, the modifier icon being unique independent of colour;
 displaying on the display for each network object a basic icon corresponding to that network object;
 for each basic icon, imparting to the basic icon the attribute representative of the base state of the corresponding network object;

for each basic icon for which there is supplementary states(s) information superimposing partially upon the basic icon one or more modifier icons representative of the supplementary state(s) of the corresponding network object;

whereby the icon representing a given network object can continuously convey the base state of the network object and its supplementary state(s) if any.

2. The method according to claim 1 wherein each network object can be in combinations of states and statuses as defined by a network management model and wherein each base state represents a predetermined state, status, or a combination of states and statuses selected from the network management model.

3. The method according to claim 1 wherein said attribute is selected from a predetermined set of attributes comprising a set of different icon borders.

4. The method according to claim 1 further comprising the step of adding text to the modifier icons to provide details of the supplementary states.

5. The method according to claim 1 wherein a different basic icon shape is used to represent each of three types of network objects, the three types being nodes, links and cards.

6. The method according to claim 5 wherein nodes are represented by a basic icon consisting of a square icon.

7. The method according to claim 5 wherein cards are represented by a basic icon consisting of a vertically oriented rectangular icon.

8. The method according to claim 5 wherein links are represented by a basic icon consisting of a link icon having thin rectangular segments.

9. The method according to claim 2 wherein more commonly occurring state, status or state/status combinations are mapped onto base states, and less commonly occurring state, status or state/status combinations are mapped onto supplementary states.

10. The method according to claim 1 wherein symbols are used on each basic icon to identify the network object represented by that basic icon.

11. The method according to claim 1 further comprising the step of displaying at least one pictorial icon for a network object, the pictorial icon being devoid of any base state or supplementary state information.

12. The method according to claim 1 further comprising the step of selecting a group of said basic icons according to a predetermined criterion and displaying a single container icon representing the group of icons rather than displaying the group of icons individually.

13. The method according to claim 12 wherein the container icons are transparent or translucent and overlay a map displayed on the display.

14. The method according to claim 12 wherein the container icons each have a user definable shape.

15. The method according to claim 12 wherein the container icons are flexible and polygonal.

16. The method according to claim 12 wherein the container icons are imparted with icon attributes and modifier icons to reflect the base states and supplementary states of network objects represented by the container.

17. The method according to claim 12 wherein the container icons are expandable to display the icons in the group of icons represented by the container icon.

18. The method according to claim 1 further comprising the steps of:

receiving network management information;

converting the network management information into the base state for each said at least one network object.

19. The method according to claim 1 further comprising the step of expanding at least one basic icon to a larger size and displaying additional information on the icon.

20. The method according to claim 19 wherein the additional information is graphical.

21. The method according to claim 19 wherein the additional information is textual.

22. The method according to claim 2 wherein the states and statuses are a subset of those specified by the OSI standard.

23. The method according to claim 2 wherein the states and statuses are a subset of the primary states and the secondary states specified by the BellCore requirement.

24. A method for displaying OSI state and status information relating to a telecommunications network consisting of a plurality of network objects using a network management terminal having a display and processing means, the method comprising the steps of:

the processing means converting the OSI state and status information into a base state and supplementary state(s) for each network object;

defining a unique attribute representative of each base state, the attribute being unique independent of colour;

defining a unique modifier icon representative of each supplementary state, the modifier icon being unique independent of colour;

the processing means displaying on the display for each network object a basic icon representative of that network object, the basic icon being a node icon for a node network object, a card icon for a card network object, and a link icon for a link network object;

imparting to the display of at least one basic icon the attribute representative of the base state of the network object represented by the basic icon;

adding to the display of each basic icon one modifier icon partially superimposed upon the respective basic icon representative of each supplementary state of the network object represented by the basic icon;

whereby the icon representing a given network object can continuously convey the base state of the network object and its supplementary state(s) if any.

25. A method according to claim 24 wherein the node icon is a square icon, the card icon is a vertically oriented rectangular icon, and the link icon is an icon having thin rectangular segments.

26. A system for monitoring a telecommunications network consisting of a plurality of network objects, the system consisting of:

a network management terminal having a display and processing means;

means for conveying network management information from the network to the network management terminal;

memory for storing a unique attribute representative of each of a plurality of base states, the attribute being unique independent of colour and for storing a unique modifier icon representative of each of a plurality of supplementary states, the modifier icon being unique independent of colour;

wherein the processing means displays on the display for each network object a basic icon representative of that network object;

wherein the processing means converts the network management information into a base state and/or a base state and supplementary states for each of at least one network object;

wherein the processing means imparts to each basic icon representative of said at least one network object the attribute representative of the network object's base state;

wherein the processing means adds a modifier icon for each supplementary state partially superimposed over the respective basic icon.

27. The system according to claim 26 wherein the network management information consists of a state, status, or a combination of states and statuses for each said at least one network object.

28. The method according to claim 2 wherein said information further comprises alarm information, the method further comprising the steps of:

imparting to the display of each basic icon alarm modifiers which convey a summary of the alarm information.

29. The method according to claim 28 wherein said alarm information consists of a respective number of alarms for each of a number of different severities, and said summary comprises the number of alarms of the highest severity indicated alphanumerically, and whether there are additional lower severity alarms indicated symbolically.

30. The method according to claim 29 wherein said alarm information further comprises for each alarm an indication of whether the alarm is new, and wherein said summary further comprises a summary of new alarms.

31. The method according to claim 30 wherein said summary of new alarms comprises the number of new alarms of the highest severity indicated numerically in an alarm modifier icon.

32. The method according to claim 31 wherein said summary of new alarms is presented in a bubble shaped modifier icon.

33. The method according to claim 28 wherein said alarm information further includes an indication of whether there are one or more outstanding alarms, the method comprising the step of imparting an additional outline surrounding the basic icon, the additional border representing the highest severity of any outstanding alarm.

34. The method according to claim 33 further comprising the step of imparting a colour to the basic icon representing the highest severity of any outstanding or new alarm.

35. The method according to claim 1 further comprising the step of including a second basic icon displayed partially behind the basic icon for components which have both primary and secondary resources, and imparting attributes and modifier icons to the second basic icon as a function of the states of the secondary resource.

36. The method according to claim 1 wherein the state information is OSI state information and the attributes comprise:

a dashed border for the OSI state combination "disabled, idle";

a shaded border for the OSI state combination "enabled, idle"; and a border with a three dimensional appearance for the OSI state combination "enabled, active".

37. The method according to claim 1 wherein the state and status information is OSI state and status information and the modifier icons comprise:

an icon in the shape of a lock for the OSI administrative state "locked";

an icon in the shape of a box containing a bar graph symbol for the OSI availability status "in test";

an icon in the shape of a broken stick for the OSI availability status "failed";

an icon in the shape of a power plug for the OSI availability status "power off";

an icon in the shape of a clock for the OSI availability status "off duty";

an icon in the shape of a box containing a bar graph symbol for the OSI control status "subject to test";

an icon in the shape of a box containing a bar graph symbol with a lock on it for the OSI control status "reserved for test".

38. The method according to claim 37 wherein the modifier icons further comprise:

an icon in the shape of a hand with upward pointing arrowheads for the OSI procedural status "initialization required";

an icon in the shape of upward pointing arrowheads for the OSI procedural status "initializing";

an icon in the shape of downward pointing arrowheads for the OSI procedural status "terminating";

an icon in the shape of upward pointing arrowheads and a box containing a bar graph symbol for the OSI procedural status "reporting";

an icon in the shape of an inverse shaded exclamation point for the OSI availability status "degraded".

39. The method according to claim 36 wherein the state and status information is OSI state and status information and the modifier icons comprise:

an icon in the shape of a lock for the OSI administrative state "locked";

an icon in the shape of a box containing a bar graph symbol for the OSI availability status "in test";

an icon in the shape of a broken stick for the OSI availability status "failed";

an icon in the shape of a power plug for the OSI availability status "power off";

an icon in the shape of a clock for the OSI availability status "off duty";

an icon in the shape of a box containing a bar graph symbol for the OSI control status "subject to test";

an icon in the shape of a box containing a bar graph symbol with a lock on it for the OSI control status "reserved for test".

40. The method according to claim 39 wherein the modifier icons further comprise:

an icon in the shape of a hand with upward pointing arrowheads for the OSI procedural status "initialization required";

an icon in the shape of upward pointing arrowheads for the OSI procedural status "initializing";

an icon in the shape of downward pointing arrowheads for the OSI procedural status "terminating";

an icon in the shape of upward pointing arrowheads and a box containing a bar graph symbol for the OSI procedural status "reporting";

an icon in the shape of an inverse shaded exclamation point for the OSI availability status "degraded".

41. The method according to claim 40 wherein said information further comprises alarm information, the method further comprising the steps of:

imparting to the display of each basic icon alarm modifiers which convey a summary of the alarm information.

42. The method according to claim 41 wherein said alarm information consists of a number of alarms for each of a number of different severities, and said summary comprises the number of alarms of the highest severity indicated alphanumerically, and whether there are additional lower severity alarms indicated symbolically.

43. The method according to claim 42 wherein said alarm information further comprises for each alarm an indication of whether the alarm is new, and wherein said summary further comprises a summary of new alarms.

44. The method according to claim 43 wherein said summary of new alarms comprises the number of new alarms of the highest severity indicated numerically in an alarm modifier icon.

45. The method according to claim 44 wherein said summary of unacknowledged alarms is presented in a bubble shaped modifier icon.

46. The method according to claim 41 wherein said alarm information further includes an indication of whether there are one or more outstanding alarms, the method comprising the step of imparting an additional outline surrounding the basic icon, the additional border representing the highest severity of any outstanding alarm.

47. The method according to claim 45 further comprising the step of imparting a colour to the basic icon representing the highest severity of any outstanding or new alarm.

* * * * *